(12) United States Patent
Brailovskiy et al.

(10) Patent No.: US 10,157,372 B2
(45) Date of Patent: Dec. 18, 2018

(54) DETECTION AND INTERPRETATION OF VISUAL INDICATORS

(71) Applicant: Amazon Technologies, Inc., Seattle, WA (US)

(72) Inventors: Ilya Vladimirovich Brailovskiy, Mountain View, CA (US); Paul Berenberg, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 683 days.

(21) Appl. No.: 14/751,468

(22) Filed: Jun. 26, 2015

(65) Prior Publication Data

US 2016/0379176 A1 Dec. 29, 2016

(51) Int. Cl.
| | |
|---|---|
| G06K 9/00 | (2006.01) |
| G06Q 10/00 | (2012.01) |
| G06F 17/30 | (2006.01) |
| G06K 9/46 | (2006.01) |
| G06Q 30/04 | (2012.01) |
| G06Q 30/06 | (2012.01) |
| G06Q 50/28 | (2012.01) |

(Continued)

(52) U.S. Cl.
CPC ....... *G06Q 10/20* (2013.01); *G06F 17/30743* (2013.01); *G06K 9/00664* (2013.01); *G06K 9/4652* (2013.01); *G06Q 30/04* (2013.01); *G06Q 30/0631* (2013.01); *G06Q 50/28* (2013.01); *G06T 7/90* (2017.01); *G08B 5/36* (2013.01); *G06K 2209/03* (2013.01); *G06T 2207/10024* (2013.01)

(58) Field of Classification Search
CPC .. G06K 9/62; G06K 9/00; G06K 9/20; G06Q 10/00

USPC ......... 382/103, 104, 209; 705/26.7
See application file for complete search history.

(56) References Cited

U.S. PATENT DOCUMENTS

| | | | |
|---|---|---|---|
| 8,406,531 B2 * | 3/2013 | Ramanujapuram | G06F 17/30247 382/201 |
| 9,483,499 B2 * | 11/2016 | Ramanujapuram | G06F 17/30247 |

(Continued)

FOREIGN PATENT DOCUMENTS

| | | |
|---|---|---|
| EP | 2863283 A1 | 4/2015 |
| WO | 2006011141 A2 | 2/2006 |
| WO | 2009026156 A1 | 2/2009 |

OTHER PUBLICATIONS

International Search Report and Written Opinion for Application No. PCT/US2016/038636, dated Jan. 4, 2018.

(Continued)

*Primary Examiner* — Oluseye Iwarere
(74) *Attorney, Agent, or Firm* — Pierce Atwood LLP

(57) ABSTRACT

Devices, systems and methods are disclosed that detect and interpret the meaning of visual indicators (such as LEDs) of devices, and provide information and solutions to potential malfunctions to users. For example, image data of the visual indicators can be captured by an image capture device (such as a camera). The image data may then be analyzed to identify an object captured in the image data. Luminescence of pixel values in the image data corresponding to a visual indicator of the object may be used to determine a sequence of the visual indicator. Then, information corresponding to the meaning of the sequence may be sent to a device of a user or owner of the object.

18 Claims, 15 Drawing Sheets

(51) Int. Cl.
*G08B 5/36* (2006.01)
*G06T 7/90* (2017.01)

(56) References Cited

U.S. PATENT DOCUMENTS

| | | | |
|---|---|---|---|
| 9,665,596 B2* | 5/2017 | Ramanujapuram | G06F 17/30247 |
| 2003/0059088 A1* | 3/2003 | Culp | G06K 9/2054 |
| | | | 382/104 |
| 2010/0214411 A1 | 8/2010 | Weinmann et al. | |
| 2011/0062229 A1* | 3/2011 | Rhoads | G06F 17/30876 |
| | | | 235/375 |
| 2012/0230540 A1* | 9/2012 | Calman | G06K 9/00221 |
| | | | 382/103 |
| 2012/0258776 A1* | 10/2012 | Lord | G06F 17/30244 |
| | | | 455/556.1 |
| 2013/0223744 A1* | 8/2013 | Ramanujapuram | G06F 17/30247 |
| | | | 382/182 |
| 2014/0055553 A1* | 2/2014 | Lee | G06K 9/00288 |
| | | | 348/14.07 |
| 2014/0056172 A1* | 2/2014 | Lee | H04W 4/70 |
| | | | 370/254 |
| 2015/0011194 A1* | 1/2015 | Rodriguez | G06K 9/00986 |
| | | | 455/414.1 |
| 2016/0247015 A1* | 8/2016 | Lee | G06K 9/00288 |
| 2017/0024414 A1* | 1/2017 | Ramanujapuram | G06F 17/30247 |

OTHER PUBLICATIONS

Partial International Search from the International Searching Authority, dated Sep. 5, 2016, Applicant: Amazon Technologies, Inc., 6 pages.

International Search Report, dated Oct. 27, 2016, Applicant: Amazon Technologies, Inc., 16 pages.

* cited by examiner

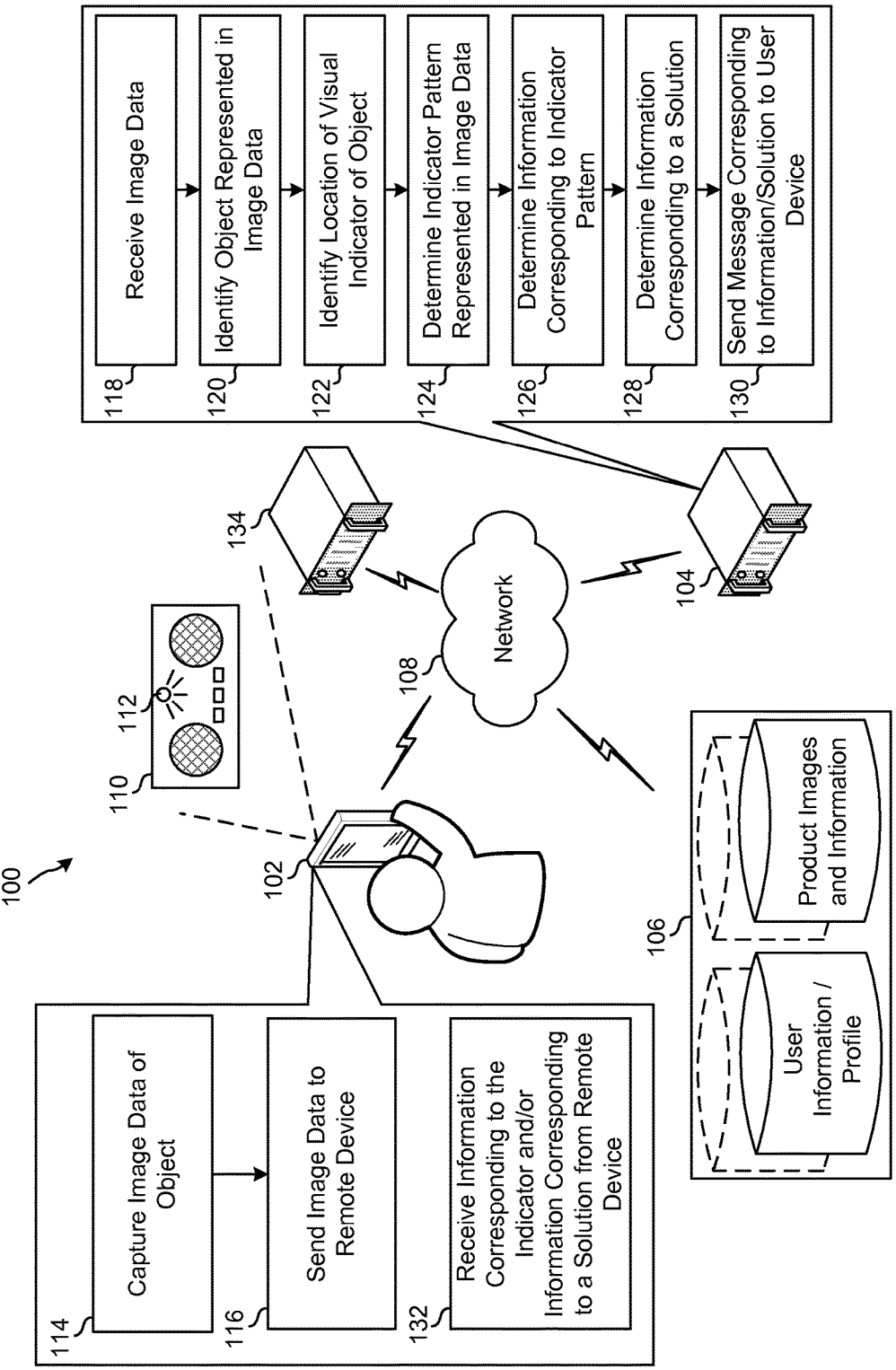

FIG. 2

| LED Pattern | Description | Mode |
|---|---|---|
| | Off | No Power |
| | One Long Blink (equal duration) | No Connection to Computer |
| | One Short Blink | Serial Connection, Radio Off |
| | One Long Blink | Serial Connection, Radio On |
| | Two Short Blinks | USB Connection, Radio Off |
| | One Short Blink Followed by One Long Blink | USB Connection, Radio On |
| | Two Short Blinks Followed by One Long Blink | USB Connected, but Driver Not Installed |
| | Three Short Blinks | USB Connected, Driver Installed, but Application Not Running |

200

202, 204, 206, 208, 210, 212, 214, 216

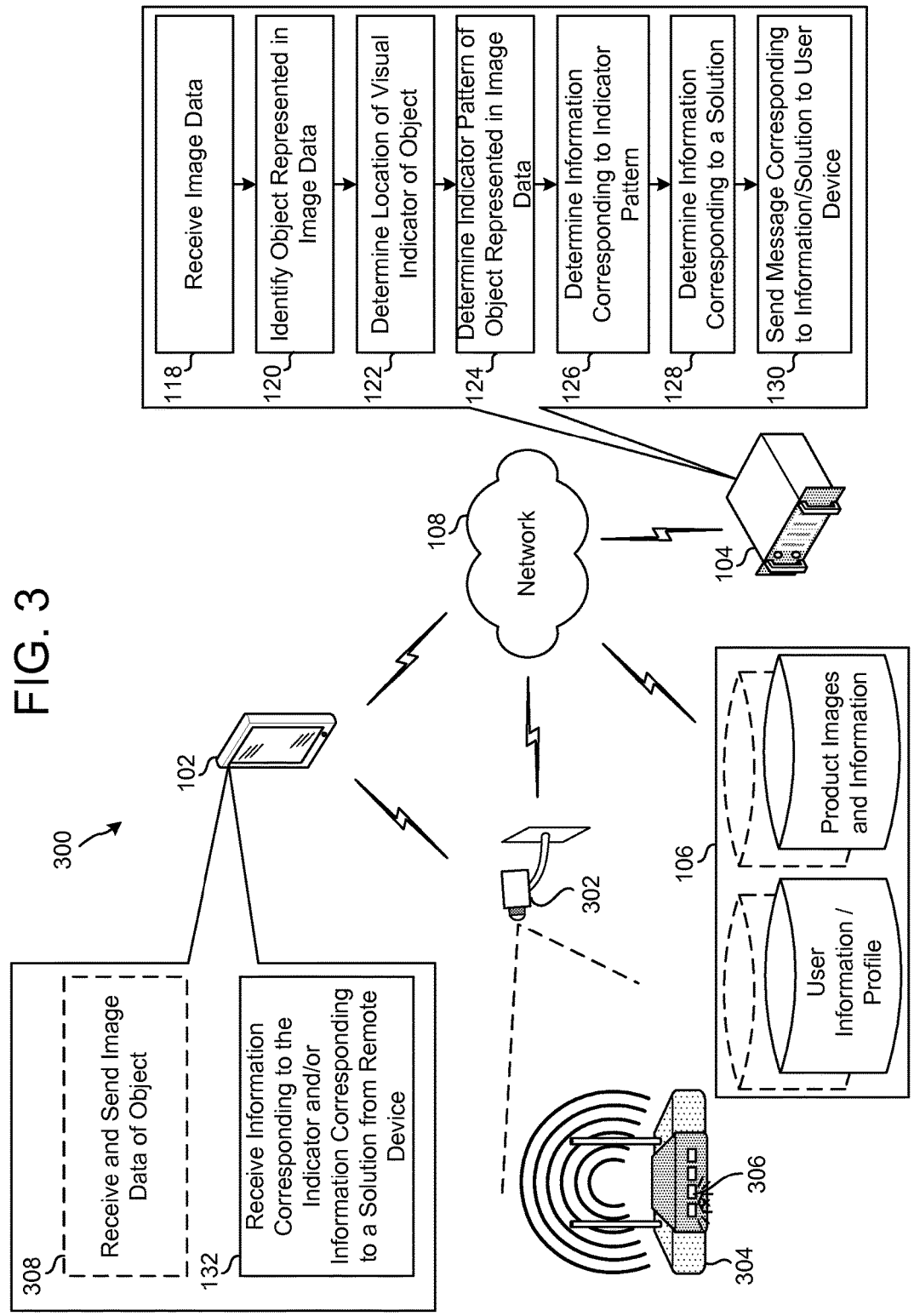

DETECTION AND INTERPRETATION OF VISUAL INDICATORS

BACKGROUND

With the advancement of technology, the use and popularity of electronic devices has increased considerably. It is also common for people to have multiple home electronic devices and appliances. Some of these devices have indicators such as Light Emitting Diodes (LEDs) that flash or illuminate to indicate some piece of information to the user (such as, a battery is low, power is on, power is off, etc.). However, with some devices, it may not be readily ascertainable to the user what the device is communicating by flashing or illuminating one or more LEDs or activating other such ambiguous indicators.

BRIEF DESCRIPTION OF DRAWINGS

For a more complete understanding of the present disclosure, reference is now made to the following description taken in conjunction with the accompanying drawings.

FIG. 1 illustrates an overview of a system for implementing embodiments of the present disclosure.

FIG. 2 illustrates an exemplary interpretation of a visual indicator according to embodiments of the present disclosure;

FIG. 3 illustrates another overview of a system for implementing embodiments of the present disclosure.

DETAILED DESCRIPTION

Figure 4:
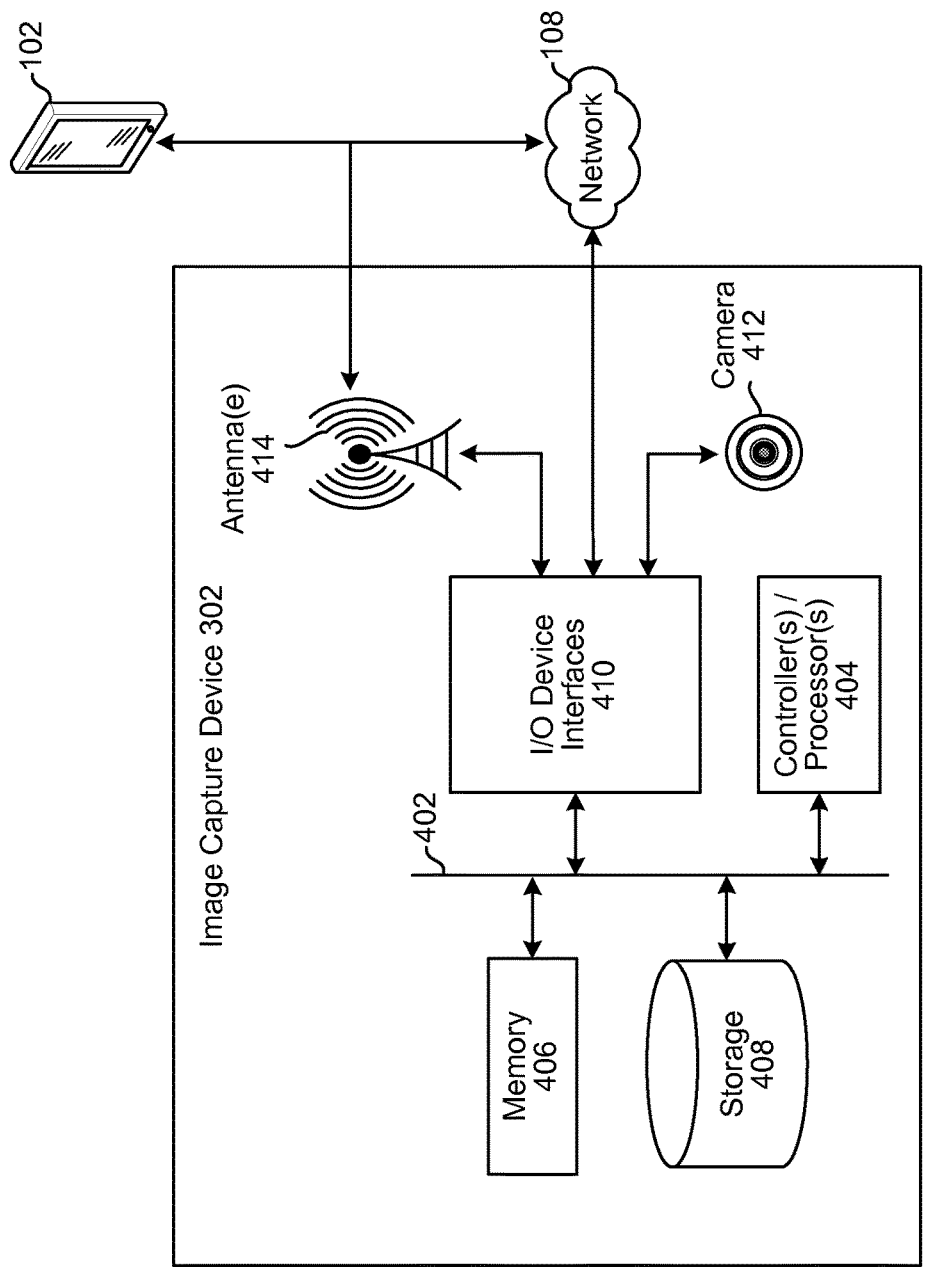
FIG. 4 is a block diagram conceptually illustrating an exemplary device according to embodiments of the present disclosure.

Home electronic devices (such as, DVD/BluRay players, wireless routers, televisions, stereos, etc.) and electrical appliances (smoke detectors, thermostats, refrigerators, stoves, hot water heaters, furnaces, etc.) are ubiquitous. Many of these devices do not have any wired or wireless connectivity for presenting information to a user. Rather, such devices may include an interface comprising one or more visual indicators (such as Light Emitting Diodes (LEDs)) that flash/blink or illuminate in a particular sequence or an audio indicator that beeps (such as a speaker that outputs a beep) in a particular sequence to communicate some piece of information to a user. For example, a stove may have a visual indicator that illuminates to indicate when the stove is on; a wireless router may have a visual indicator that turns on or off to indicate when an Internet connection is working or not working; a coffee maker may have a visual indicator that illuminates to indicate that the coffee is still warm; a smoke detector may have a visual indicator and/or audio indicator that activates to indicate that a battery is low; a carbon monoxide sensor may have a visual indicator and/or audio indicator that activates to indicate a malfunction occurred, etc. Many other such examples may easily be imagined. Due to the ubiquity of such devices, and the relative lack of intuitive meaning of their respective indicators, it can be difficult for a user to know at first glance the meaning of any particular indicator. Further, it can be difficult to track such indicators across multiple devices. Offered are improvements to interpreting and monitoring the status of such indicators.

System and methods are disclosed that detect and interpret the meaning of visual and/or audio indicators of devices, and provide information and solutions to potential malfunctions to users. For example, sequences of visual indicators (such as LEDs) and/or audio indicators (such as speakers that output beeps) generated by home electronics and other devices may be monitored using an image capture component in the user's home or office (such as a Dropcam® camera, tablet computer, smartphone, etc.) or audio capture component (such as a microphone), and the sequences may be interpreted to provide users with information of what is wrong with a device, how to fix a device, purchase a new device, offer repair services, ability to purchase components or replenishables (such as a battery if the indicator corresponds to a battery being low or a coffee refill), etc. The systems and methods may also provide users with notifications relating to such indicators when the user is away from the respective device(s).

For example, an image capture device may capture image data of visual indicators of a device (for example, a furnace) in a user's home and send that data to a remote device for processing. The remote device may identify the indicator pattern or sequence and identify a corresponding meaning of the pattern. As an example, the visual indicators may indicate that the hot water heater is not functioning properly due an increase in pressure. In this instance, the remote device may send a message or other notification (such as a text message, email, telephone call, etc.) to the user informing the user of the issue. The remote device may also provide instruction to relieve the pressure and/or contact information for a local repair service (or simply call a repair person or service for the user). Such a system is particularly useful where the device (e.g., furnace) is not itself equipped with communication components.

In another embodiment, the system and methods include an image capture device (such as a camera) and/or an audio capture device (such as a microphone) configured to capture image and/or audio data of indicators, and send the data to a remote device for processing. The image data may be a single image, a plurality of images captured in succession having sufficient length to capture a sequence being output by the visual indicator, a video having sufficient length to capture a sequence being output by the visual indicator, etc.

The image and/or audio capture device(s) may be associated with a device ID, and send the ID along with the data to the remote device. In this respect, the ID may be associated with one or more objects. The objects may be objects that are represented in the image data and/or objects emitting an audio indicator. Thus, the remote device may use the ID to identify the objects and then interpret the indicator(s). The ID may also be associated with a user ID (such as a number associated with a particular user) or other type of user profile (which may include a variety of data related to a particular user including a user name, mailing address information, billing/payment information, preference information, order history information, and other information for placing and completing an order/purchase of a product, etc.), for example a profile of the owner of the object may be linked to the device ID of the object through a previous purchase history, system configuration, or the like. The user profile may also be configured to allow product(s) to be ordered corresponding to the interpretation of the indicator(s). For example, when one of the objects is a coffee machine, the indicator may indicate that the coffee machine is out of or low on coffee, and the remote device may simply order more coffee refills for the coffee machine (in accordance with the user preferences) and ship the coffee to the user. The indicator or indicator sequence may also correspond to any number of other actions. For example, the indicator may correspond to a situation in which the coffee machine has malfunctioned. In this situation, the remote device may send a notification to a user device of the issue and offer repair services, provide an option to purchase a new coffee machine, provide instructions on how to fix the coffee machine, call a repair person or service, schedule a repair service to go to the user's home and look at/fix the coffee machine, etc.

In an example, a camera installed in a home may capture images of a coffee machine with one or more blinking lights illuminated. This image data from the camera may be sent to a remote server. The server analyzes the data and based on the look of the machine, the remote device can identify the brand and model of the coffee machine. The server may then determine what the particular blinking lights mean using a lookup table (LUT) or other database matching the lights to the coffee machine model. For example, the server may determine that the coffee machine is out of water, is still hot, etc. The camera may also be associated with the device ID so that when the data is sent to the server, the device ID is sent as well (or is looked up by the server) so that the server can access any preconfigured actions to be performed based on the how the lights are blinking For example, the server may determine from the lights that the coffee machine is out of coffee. Because the device and/or camera may also be linked to a user profile (in this case the owner of the machine), the server may simply order more coffee and send the coffee to the user at the user's home address listed in the user profile.

The systems and methods described herein allow for previous manufacturers of objects and other products to maintain their current design, and leverage the indicators to provide Internet of Things (IoT) automation without the cost of WiFi, Bluetooth, or other networking hardware. Additionally, the systems and methods allow for to manufacturing cost of objects and other products to be reduced by replacing more traditional displays (such as a Liquid-crystal-display (LCD)) with indicators that can be interpreted to provide communication to the user and perform actions.

FIG. 1 illustrates an overview of a system 100 for implementing embodiments of the disclosure. The system includes a user device 102, a remote device 104, and one or more databases 106 that may be in communication with one another over a network 108. In this embodiment, the user device 102 may capture image data of an object 110 (a radio in the embodiment) having a visual indicator 112 (such as an LED). The image data may be a single image, a plurality of images captured in succession having sufficient length to capture a sequence being output by the visual indicator 112, a video having sufficient length to capture a sequence being output by the visual indicator 112, etc.

Thus, the user device 102 captures image data of the object 110, illustrated as block 114. The user device 102 then sends the captured image data to the remote device 104, illustrated as block 116. The remote device 104 receives the image data, illustrated as block 118, and identifies the object 110 represented in the image data, illustrated as block 120. The remote device 104 may identify the object 110 (such as a type and model for a radio, microwave, television, DVD/BluRay player, a toy, a security device, etc.) based on the user's purchase history in a user profile. For example, if the user bought the object 110 from a merchant associated with the remote device 104 or added/tagged a particular object 110 as being in the house or in the camera's field of view, this may be used to identify the object 110 and/or narrow the options of what is represented in the image data.

The remote device 104 may identify the object 110 using various image matching techniques. One such technique may include identifying features points of the object 110 represented in the image data. The features may include feature points of the object 110 represented in the image data (as described in further detail below and as known in the art), textures in the image data, colors in the image data, etc. The remote device 104 may then compare the features points to known features points of one or more known objects stored in databases 106, such as the product images and information database(s). The remote device 104 may also perform geometric verification to confirm whether the objects match.

The remote device 104 also identifies a location (such as pixel coordinates in an image frame corresponding to a location of the indicator relative to the object) of the indicator 112, illustrated as block 122. As part of the data in the product images and information database(s) 106, known locations of indicator(s) in the known objects are stored as reference data. Thus, once the object 110 in the captured image data is matched to a known object and identified, the remote device 104 may identify a location of the indicator 112 of the object 110 in the image data based on the information stored in the product images and information database(s) 106.

The remote device 104 may then determine an indicator pattern (also referred to herein as a sequence) of the indicator 112 in the image data, illustrated as block 124. This may be performed by determining a luminescence and/or color of pixel values in the location of the indicator 112 and comparing the luminescence and/or color to known indicator patterns (also stored as part of the reference data and referred to as reference indicator patterns) corresponding to the identified object 110, which are stored in the product images and information database(s) 106. The remote device 104 may also determine information corresponding to the indicator pattern, illustrated as block 126. This data may also be stored as part of the reference data in the product images and information database(s) 106. For example, the product images and information database(s) 106 may include data relating to known objects correlated with known indicator patterns, which are correlated with known information and potential solutions based on the pattern. This allows the remote device 104 to determine an indicator pattern, determine information corresponding to the indicator pattern, and determine information corresponding to a solution, illustrated as block 128, to fix any issue that the object 112 may be experiencing. The solution may be instruction on how to fix the object, optional local repair services that may be contacted, an option to purchase a new object/product, etc.

Referring to FIG. 2, a table 200 of information corresponding to indicator patterns for the object 110 is illustrated. As illustrated, the object 110 has eight different indicator patterns 202-216. The indicator pattern 202 corresponds to the indicator 112 being off (or not illuminated), which corresponds to the object 110 being in a power off mode or no power mode. The indicator pattern 204 corresponds to the indicator 112 illuminating once for a long blink followed by non-illumination of equal duration, which corresponds to the object 110 having no connection to a computer. The indicator pattern 206 corresponds to the indicator 112 illuminating once for a short blink followed by non-illumination, which corresponds to the object 110 having a serial connection, but being in an off mode. The indicator pattern 208 corresponds to the indicator 112 illuminating once for a long blink, which corresponds to the object 110 having a serial connection and being in an on mode. The indicator pattern 210 corresponds to the indicator 112 illuminating twice for two short blinks, which corresponds to the object 110 having a universal serial bus (USB) connection, but being in an off mode. The indicator pattern 212 corresponds to the indicator 112 illuminating twice, once for a short blink followed by one long blink, which corresponds to the object 110 having a USB connection, but being in an on mode. The indicator pattern 214 corresponds to the indicator 112 illuminating three times, twice for two short blinks followed by one long blink, which corresponds to the object 110 having a USB connection, but having a driver not installed. The indicator pattern 216 corresponds to the indicator 112 illuminating three times for three short blinks, which corresponds to the object 110 having a USB connection, a driver installed, but an application is not running Referring back to FIG. 1, the remote device 104 sends a message corresponding to the information corresponding to the indicator pattern and/or information corresponding to a solution (if an issue exists) to the user device 102, illustrated as block 130. The user device 102 receives the information corresponding to the indicator pattern and/or information corresponding to a solution, illustrated as block 132. The user may use this information as desired. The message including the information may be sent in a variety of ways depending on the configuration of the system/user device 102. For example, if the user is operating an augmented reality system using a smartphone, goggles, etc. where video data is captured and displayed to the user with additional augmented reality information, the message including the information regarding the indicator pattern may be displayed over the video data (for example, near the representation of the visual indicator in the video data), thus providing an augmented reality presentation of the meaning of the indicator pattern. The information may also be scrolled across the user device 102, sent as an email, text/SMS message, etc.

For example, referring to FIGS. 1 and 2, when the indicator pattern of the object 110 is determined to be the indicator pattern 204, the user device 102 may receive information that informs the user that the indicator 112 of the object 110 presented one long blink, which means the object 110 is not connected to a computer. The user device 102 may also receive instructions on how to connect the object 110 to a computer. The user device 102 may also receive information relating to what to do in the event the user would like assistance with connecting the object 110 to the computer in the form potential customer assistance (for example a customer service of a manufacturer of the object 110) or repair services the user may contact. The user device 102 may also receive options to purchase a new object 110 or other similar objects, in the event the user would like a new radio.

As described above, the remote device 104 determines an indicator pattern of the indicator 112 in the image data and information corresponding to a meaning of the indicator pattern using data stored in the product images and information database(s) 106. However, the remote device 104 may also communicate with a third party database 134 (such as a manufacturer of the object 110) to obtain data relating to the indicator pattern and information corresponding to the indicator pattern. For example, when the product images and information database(s) 106 has limited data relating to the object 110, the remote device 104 may send a request to the third party 134 for data relating to the indicator pattern and information corresponding to the indicator pattern.

FIG. 3 illustrates another overview of a system 300 for implementing embodiments of the disclosure. The system includes the user device 102, the remote device 104, one or more databases 106, and an image capture device 302 that may be in communication with one another over the network 108. In this embodiment, the image capture device 302 may be a stand-alone camera that captures image data of an object 304 (a router in this embodiment) having more than one visual indicators 306 (such as LEDs). The image data may be a single image, a plurality of images captured in succession having sufficient length to capture a sequence being output by the visual indicators 306, a video having sufficient length to capture a sequence being output by the visual indicators 306, etc.

In this embodiment, the image capture device 302 may be continuously monitoring the object 304 by capturing image data or periodically capturing image data (such as every minute, 10 minutes, 30 minutes, hourly, once a day, etc.). When the image capture device 302 is connected to a continuous power source, the image capture device 302 may be capturing image data continuously or more frequently. However, when the image capture device 302 is not connected to a continuous power source, but has a battery, it may be desired to have the image capture device 302 capture image data less frequently to conserve power.

As described above, the image capture device 302 captures image data of the object 304. The image capture device 302 may then send the captured image data directly to the remote device 104 over network 108. Optionally, the image capture device 302 may send the captured image data to the user device 102 or other device in the home via an out of band communication (such as Bluetooth) and the user device 102 or other device in the home may then send the captured image data to the remote device 104 over network 108, illustrated as block 308.

Once the image data is captured and sent to the remote device 104, the method proceeds in a similar manner to that described above with reference to FIG. 1. For example, the remote device 104 receives the image data, illustrated as block 118, and identifies the object 304 represented in the image data, illustrated as block 120. The remote device 104 identifies a location of the indicators 306, illustrated as block 122. The remote device 104 determines an indicator pattern of the indicators 306 in the image data, illustrated as block 124. The remote device 104 determines information corresponding to the indicator pattern, illustrated as block 126, and determines information corresponding to a solution, illustrated as block 128. The remote device 104 then sends a message including the information corresponding to the indicator pattern and/or information corresponding to a solution (if an issue exists) to the user device 102, illustrated as block 130. The user device 102 receives the information corresponding to the indicator pattern and/or information corresponding to a solution, illustrated as block 132. The user may use this information as desired. For example, as illustrated in FIG. 3, the indicator pattern of the object 304 is includes two illuminated LEDs. In this example, the user device 102 may receive information that informs the user that the object 304 is connected to the Internet and functioning properly.

FIG. 4 is a block diagram conceptually illustrating example components of the image capture device 302. The image capture device 302. In operation, the image capture device 302 may include computer-readable and computer-executable instructions that reside on the image capture device 302, as described below.

The image capture device 302 may include an address/data bus 402 for conveying data among components of the image capture device 302. Each component within the image capture device 302 may also be directly connected to other components in addition to (or instead of) being connected to other components across the bus 402.

The image capture device 302 may include one or more controllers/processors 404 that may each include a central processing unit (CPU) for processing data and computer-readable instructions, and a memory 406 for storing data and instructions. The memory 406 may include volatile random access memory (RAM), non-volatile read only memory (ROM), non-volatile magnetoresistive (MRAM) and/or other types of memory. The image capture device 302 may optionally include a data storage component 408, for storing data and controller/processor-executable instructions. The data storage component 408 may include one or more non-volatile storage types such as magnetic storage, optical storage, solid-state storage, etc.

Computer instructions for operating the image capture device 302 and its various components may be executed by the controller(s)/processor(s) 404, using the memory 406 as temporary "working" storage at runtime. The computer instructions may be stored in a non-transitory manner in non-volatile memory 406, storage 408, or an external device. Alternatively, some or all of the executable instructions may be embedded in hardware or firmware in addition to or instead of software. The computer instructions may include instructions to perform one or more of the methods described herein (for example the methods described in connection with FIGS. 3 and 8-14).

The image capture device 302 includes input/output device interfaces 410. A variety of components may be connected through the input/output device interfaces 410, such as, one or more audio capture device(s) (such as a microphone, not shown), a camera 412, and/or other such components. The input/output device interfaces 410 may also include an interface for an external peripheral device connection such as universal serial bus (USB), FireWire, Thunderbolt or other connection protocol. The input/output device interfaces 410 may also include a connection to one or more networks 108 via an antennae 414, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. For example, antennae 414 may connect to the network 108 and/or the user device 102 (for example via Bluetooth).

The image capture device 302 may include all or a subset of the components described above. It should be appreciated that one or more of the components described above with reference to FIG. 4 may be used to perform the steps of one or more of the methods described herein.

Figure 5:
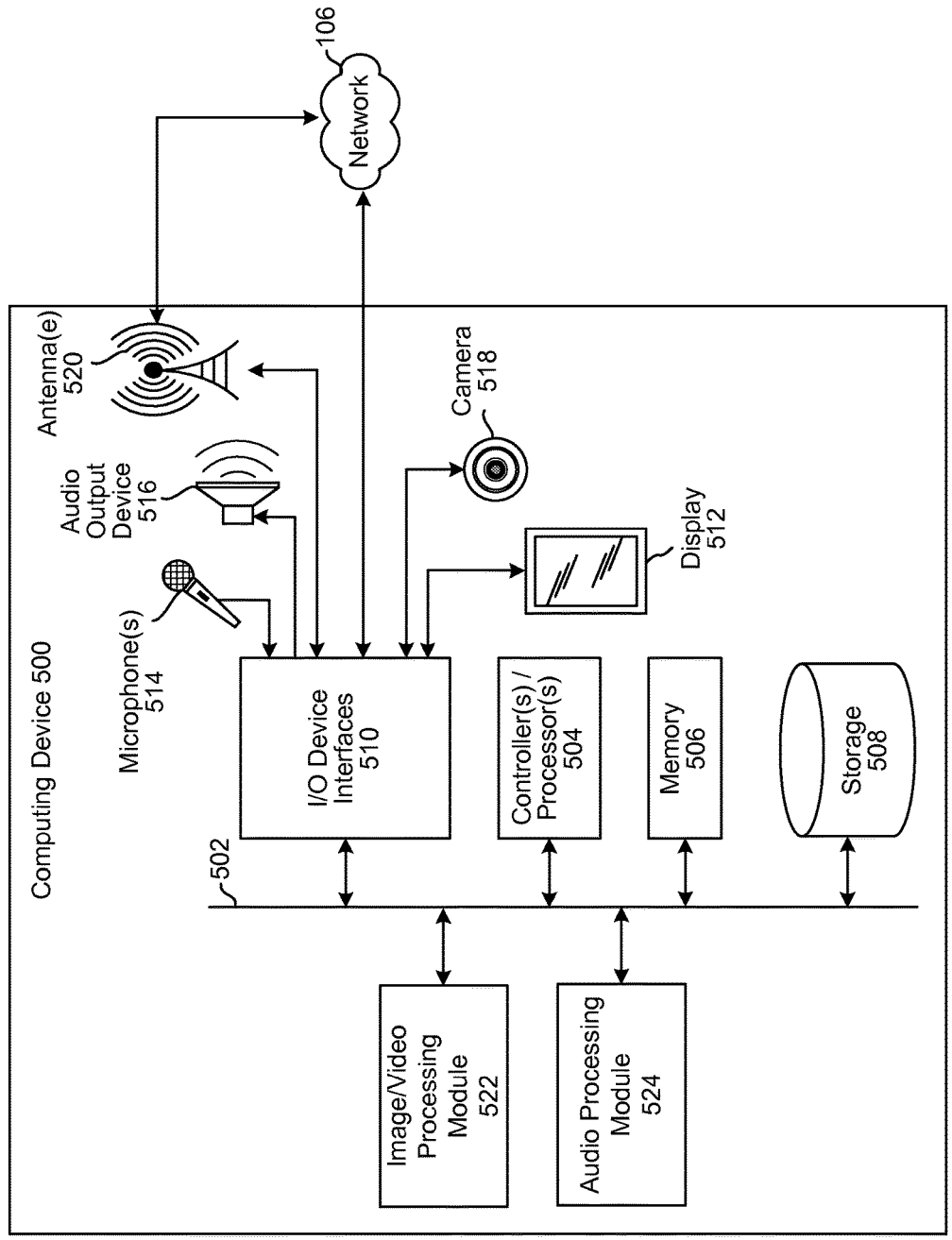
FIG. 5 is a block diagram conceptually illustrating an exemplary computing device according to embodiments of the present disclosure.

FIG. 5 is a block diagram conceptually illustrating example components of a computing device 500. The computing device 500 may be exemplary of the user device 102 and/or remote device 104. In operation, the computing device 500 may include computer-readable and computer-executable instructions that reside on the computing device 500, as described below.

The computing device 500 may include an address/data bus 502 for conveying data among components of the computing device 500. Each component within the computing device 500 may also be directly connected to other components in addition to (or instead of) being connected to other components across the bus 502.

The computing device 500 may include one or more controllers/processors 504 that may each include a central processing unit (CPU) for processing data and computer-readable instructions, and a memory 506 for storing data and instructions. The memory 506 may include volatile random access memory (RAM), non-volatile read only memory (ROM), non-volatile magnetoresistive (MRAM) and/or other types of memory. The computing device 500 may also include a data storage component 508, for storing data and controller/processor-executable instructions (e.g., instructions to perform the algorithms and methods illustrated in and described herein). The data storage component 508 may include one or more non-volatile storage types such as magnetic storage, optical storage, solid-state storage, etc. The computing device 500 may also be connected to removable or external non-volatile memory and/or storage (such as a removable memory card, memory key drive, networked storage, etc.) through input/output device interfaces 510.

Computer instructions for operating the computing device 500 and its various components may be executed by the controller(s)/processor(s) 504, using the memory 506 as temporary "working" storage at runtime. The computer instructions may be stored in a non-transitory manner in non-volatile memory 506, storage 508, or an external device. Alternatively, some or all of the executable instructions may be embedded in hardware or firmware in addition to or instead of software.

The computing device 500 includes input/output device interfaces 510. A variety of components may be connected through the input/output device interfaces 510, such as a display 512, one or more audio capture device(s) (such as a microphone or an array of microphones 514), an audio output device for producing sound (such as speaker(s) 516), a camera 518, and/or other such components. The input/output device interfaces 510 may also include an interface for an external peripheral device connection such as universal serial bus (USB), FireWire, Thunderbolt or other connection protocol. The input/output device interfaces 510 may also include a connection to one or more networks 108 via an antennae 520, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The display 512 may be a display of any suitable technology, such as a liquid crystal display, an organic light emitting diode display, electronic paper, an electrochromic display, a cathode ray tube display, a pico projector or other suitable component(s). The camera 518 and the display 512 may be integrated into the computing device 500 or may be separate.

The computing device 500 further includes an image processing module 522 and/or an audio processing module 524. The image processing module 522 receives captured image data and identifies objects using various image matching techniques, in accordance with the methods described herein. One such technique may include identifying features points of an object in the image data, comparing the features points to known features points of one or more known objects stored in databases, performing geometric verification to confirm whether the objects match, etc. The image processing module 522 may also identify a location of an indicator of an object and an indicator pattern, in accordance with the methods described herein. This allows the image processing module 522 and/or one or more controllers/processors 504 to determine information corresponding to the indicator pattern and solutions based on the pattern, in accordance with the methods described herein.

The audio processing module 524 receives captured audio data relating to an audible indicator of an object. The captured audio may be associated with an object in a user profile and/or the user may inform computing device 500 of the object the audio data relates to. This allows the audio processing module 524 and/or one or more controllers/processors 504 to match the capture audio data to known indicator pattern(s) for the known object using audio matching techniques. The audio matching techniques may include audio fingerprinting, where audio fingerprints of known objects for each indicator pattern are stored, for example, in the storage 508 and/or database(s) 106 described above. An audio fingerprint of the captured audio data may be generated and compared to the stored audio fingerprints to find match(es) between stored fingerprints and input audio. This allows the audio processing module 524 and/or one or more controllers/processors 504 to determine information corresponding to the indicator pattern and solutions based on the pattern, in accordance with the methods described herein, which may also be stored in the storage 508 and/or database(s) 106 described herein.

The computing device 500 may include all or a subset of the components described above. It should be appreciated that each of the methods described with reference to FIGS. 1-3 and 6-14 may be combined with one or more of the other methods, and one or more steps of a methods may be incorporated into the other methods. Further, one or more of the components described above with reference to FIG. 5 may be used to perform the steps of the methods described with reference to FIGS. 1-3 and 6-14.

Figure 6:
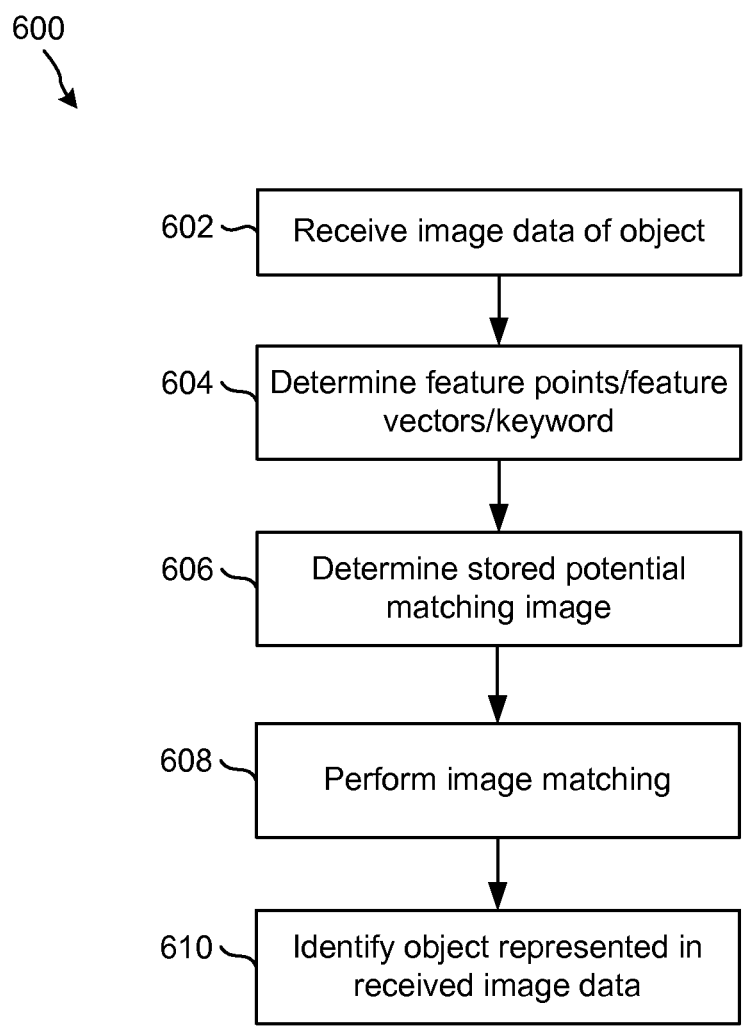
FIG. 6 illustrates an exemplary method of identifying an object according to embodiments of the present disclosure.

FIG. 6 illustrates an exemplary method 600 of performing image matching according to embodiments of the disclosure. It should be appreciated that the images and video may be of different formats, for example, an image may be a JPEG, GIF, BMP, MPEG, and the like. Further, the quality and resolution of the images and/or video may vary from one application to another. The images and/or video need not be exactly the same but a transformed version of each other. Therefore, in the image matching the image is represented in a particular format so that the images/video can be matched with each other.

In block 602, image data is received by the remote device. The remote device may perform some pre-processing on the received image data to enhance quality (such as adjusting exposure, focus, lighting, cropping, etc.) and may select a frame or image from the image data to perform image matching. The remote device may then determine feature points, feature vectors, a keyword, or other representations (such as texture, color, etc.) of the contents of the selected frame/image, illustrated as block 604. The keyword may be determined based on a mathematical function related to the feature points and/or feature vector of the selected frame/image. Feature points are specific points in an image which are robust to changes in image rotation, scale, viewpoint or lighting conditions. This means that these feature points will often be present in both the images, even if the two images differ in the manner described earlier. These feature points may also be known as "points of interest." Therefore, a first stage of the image matching may include finding these feature points in the selected frame/image.

In block 606, the remote device determines a stored potential matching image. The remote device may use one or more representations of the selected frame/image (for example, the keyword) to determine one or more putative matching stored images. An object identifier (which may be a unique alpha-numeric code) corresponding to an object may be associated with a stored image representing the object. The stored images may include only one object per image (which assists in image mapping) or, in certain instances, may include multiple objects in one image. In that case, the particular stored image may be associated with multiple object identifiers. The remote device may identify visual features of the selected frame/image (such as those indicated in the keyword) and traverse an image/object tree based on the visual features to identify one or more potentially matching stored images. Comparisons between the selected frame/image and stored images may generate one or more scores, including a matching score, confidence score, etc. Based on the score values, the remote device may select potentially matching stored images. For example, if a comparison of a stored image to a selected frame/image generates a score above a certain threshold, the stored image may be selected as a potentially matching image.

The remote device may then perform image matching, illustrated as block 608. The image matching may include comparing feature points between the selected frame/image and the stored image. The pair can be determined to be a match when a sufficient number of feature points match both visually and geometrically. Feature vectors that are close to each other are visually similar, and the corresponding feature points are called or "correspondences." The correspondences may be determined by finding dot products between feature vectors of the selected frame/image and feature vectors of stored images. The pair of feature points is a correspondence when the magnitude of the dot product of their feature vectors is greater than a predefined value. The correspondences may then be processed by a statistical algorithm to test geometric consistency. One statistical algorithm that may be used for geometric matching of images is the Random Sample Consensus (RANSAC) algorithm, although other variants of RANSAC-like algorithms or other statistical algorithms may also be used. In RANSAC, a small set of correspondences is randomly sampled. Thereafter, a geometric transformation is generated using these sampled feature points. After generating the transformation, the correspondences that fit the model are determined. The correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model. The remote device may also perform a homographic transformation or other geometric verification to check the geometries between the selected frame/image and potentially matching stored image. If the comparison of feature vectors, other features/representations, and homographic transformation result in sufficiently high score(s) (such as a comparison score, confidence score, etc.), the potentially matching stored image may be determined to be a match.

When a matching image is determined, the system may identify an object represented in the matching image, illustrated as block 610. This identification may be made based on an object identifier associated with the matching image. To confirm the match, the remote device may also perform image comparison again with a potentially matching second stored image in which the object is represented (for example, an image representing the object from a different angle from the candidate image).

Figure 7:
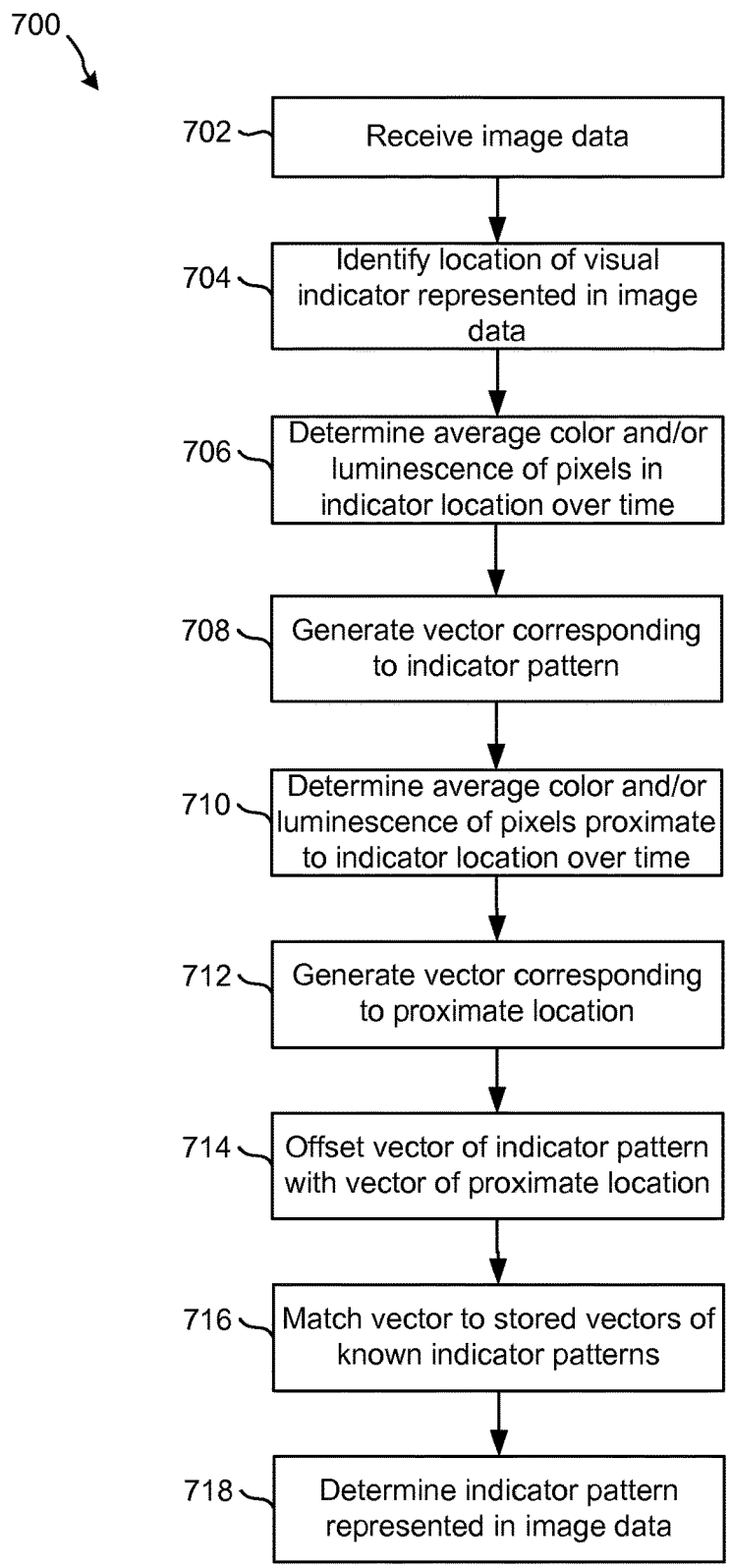
FIG. 7 illustrates an exemplary method of interpreting a visual indicator according to embodiments of the present disclosure.

Once the object in the captured image data is identified, the indicator pattern or sequence may be analyzed. FIG. 7 illustrates an exemplary method 700 of determining and interpreting indicator patterns or sequences according to embodiments of the disclosure. In block 702, the remote device may receive image data. An object in the image data is identified, as described above. The remote device then identifies a location of a visual indicator in the image data or selected frame/image of the image data, illustrated as block 704. The stored object or image in the database(s) may include location or coordinate information of where a known indicator of a known object in the stored image is located. Using this information, the remote device may identify a corresponding location or coordinates of the object in the selected frame/image.

The remote device may then determine an average color and/or luminescence of pixel values at the location of the indicator in the image data for each frame/image, illustrated as block 706. In an example, the remote device may bound the location of the indicator with a bounding region, such as a box, rectangle, circle, or other geometric shape. The remote device may then determine a data set associated with the color and/or luminescence of pixel values. This may include applying a Discreet Cosine Transform (DCT) to the bounded region and determining DC coefficients of the luminance component of the luminance/chrominance (YUV) color space of the image data for each frame/image. In other words, an average luminescence of all pixel values in this bounded region of the image data for each frame/image is determined. As a result, a time sequence DC(1), DC(2), . . . , DC(t) of integer values is obtained. Banalization of this time sequence is then performed as follows:

$$s(t) = \begin{cases} 0, & DC(t) < \theta \\ 1, & DC(t) \geq \theta \end{cases}$$

where θ is a threshold parameter, defined empirically. The θ parameter may be modified or biased for more accurate estimation of the binary sequence (for example, a normal illumination level can be biased in some environments). The binary sequence may then undergo a transformation. In one example, a number of each "1" and "0" in the binary sequence is counted. For example: (1,1,1,0,0,0,0,1,1,0, 0, . . . )→(3,4,2, . . . ).

The remote device may then generate a vector corresponding to the indicator pattern, illustrated s block 708. For example, a finite vector of integer natural numbers $V_{test}$ may be generated. The length of this vector is defined by a base sequence or pattern of the indicator of the object (all signals for a given object have limited duration). A set of integer reference vectors $V_{ref}^i$ for each valid signal may also be generated and stored in connection with the object identifier. These vectors may then be used to determine the indicator pattern/sequence in the image data.

However, in some situations external illumination may affect the luminescence of the image data. To reduce false detection created by external illumination changes such as strobe lightning, etc., the remote device may then determine an average color and/or luminescence of pixel values in a second bounded region proximal to the location of the indicator in the image data for each frame/image, illustrated as block 710. For this second bounded region, the remote device may perform the same analysis as described above for the bounded region including the indicator and produce a second data set (such as a second vector of integer natural numbers $V_{test}$), illustrated s block 712. The $V_{test}$ of the indicator and the $V_{test}$ of the second bounded region may then be offset, illustrated as block 714. For example, when $V_{test}$ of the indicator is similar or close to $V_{test}$ of the second bounded region, the signal may be determined to be generated by external forces and the $V_{test}$ of the indicator may be offset by the $V_{test}$ of the second bounded region or the $V_{test}$ of the indicator may be discarded.

Once the data set (such as $V_{test}$) of the indicator in the image data is determined, the $V_{test}$ of the indicator may be compared to the stored data sets (such as stored vectors) corresponding to the object to determine a match, illustrated as block 716. For example, the following rule may be implemented (where $\alpha_1$ and $\alpha_2$ are another tuning parameters):

$$V_{test}(v_{test_1}, v_{test_2}, \ldots, v_{test_n}) \text{ corresponds to } V_{ref}^i(v_{ref_1}, v_{ref_2}, \ldots, v_{ref_m})$$

if $$n = m$$

$$|v_{test_j} - v_{ref_j}| < \alpha_1$$

$$\sum_{j=1}^{n} (v_{test_j} - v_{ref_j}) < \alpha_2$$

When a match is found, the remote device determines the indicator pattern/sequence in the image data corresponds to the matching pattern/sequence, illustrated as block 718. Some indicator sequences are defined using color signals, for example, a sequence could include 3 red blinks and 7 yellow blinks. In this case the same analysis described above may be performed for each color and the sequence detected accordingly. In another example, the analysis described above may be modified is to support a variable frame rate of the image capture device. In this situation, the components of the vector $V_{test}$ of the indicator correspond to the frame rate sequence.

In another example, the object with the indicator may output text data in a generic text format (e.g. American Standard Code for Information Interchange (ASCII)) and the indicator output baud rate (LR) is lower than the frame rate (FR) for the image capture device (e.g. 16 breakover diode (BOD) blinking pattern and 25 frames per second (FPS) image capture). Thus, the image capture device captures the vector of the indicator sequence without missing bits. The capture produces redundancy. If FR is not divisible by LR, the redundant bits are inconsistent. The indicator may produce a concise synchronization sequence that is repeatable. Given one second aligned baud rates, one second is the minimum required to determine the synchronization pattern. The indicator may produce the sequence of alternating ones and zeros for a minimum of one second (e.g. at 16 BOD the device sends 2 octets of hexadecimal 55). The image capture device receives FR minus LR redundant hits if the capture is successful for a full second. This sequence is repeatable and depends on the offset. The image capture device may identify all bits that are the same as the previous one (e.g. FR=25, LR=16; 2,5,8,11,13,16,19,22,24 (0-24 numeration)). The image capture device then skips these bits in each FR long sequence of bits during real-time capture or post-capture analysis of the subsequent data.

In order to output encapsulated text and with the ability to separate messages, the image capture device may use High-level Data Link Control (HDLC) framing. The indicator/object may begin outputting HDLC framed data after a synchronization preamble, for example as shown below:

| Preamble (hex) | HDLC Frame (hex) | Data | HDLC Frame (hex) |
|---|---|---|---|
| 5555 | 7E | "Error code 245" | 7E |

As mentioned above, in other embodiments, the system and methods include an image capture device (such as a camera) and/or an audio capture device (such as a microphone) configured to capture image and/or audio data of indicators, and send the data to a remote device for processing. The image and/or audio capture device(s) may be associated with a device ID, and send the device ID along with the data to the remote device. In this respect, the device ID may be associated with one or more objects. The objects may be objects that are captured in the image data and/or objects emitting an audio indicator. Thus, the remote device may use the device ID to identify the objects and then interpret the indicator(s).

Figure 8:
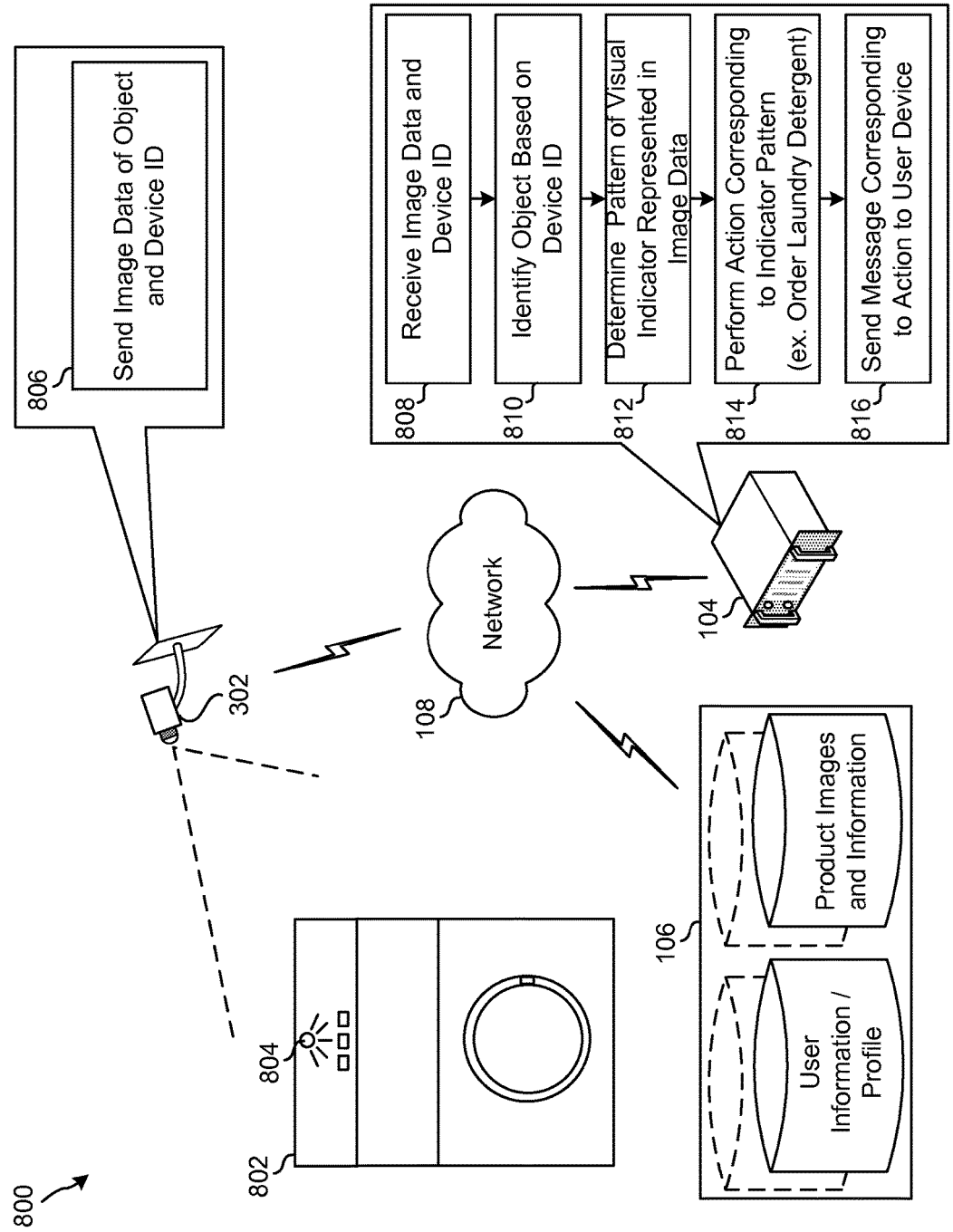
FIG. 8 illustrates another overview of a system for implementing embodiments of the present disclosure.

FIG. 8 illustrates another overview of a system 800 for implementing embodiments of the disclosure. The system includes the image capture 302, the remote device 104, and the one or more databases 106 that may be in communication with one another over the network 108. In this embodiment, the image capture device 302 may be a stand-alone camera that captures image data of an object 802 (a washing machine in this embodiment) having one or more visual indicators 804 (such as LEDs). The image data may be a single image, a plurality of images captured in succession having sufficient length to capture a sequence being output by the visual indicators 804, a video having sufficient length to capture a sequence being output by the visual indicators 804, etc.

In this embodiment, the image capture device 302 may be continuously monitoring the object 802 by capturing image data or periodically capturing image data (such as every, minute, 10 minutes, 30 minutes, hourly, once a day, etc.). When the image capture device 302 is connected to a continuous power source, the image capture device 302 may be capturing image data continuously or more frequently. However, when the image capture device 302 is not connected to a continuous power source, but has a battery, it may be desired to have the image capture device 302 capture image data less frequently to conserve power.

As described above, the image capture device 302 captures image data of the object 802. The image capture device 302 may then send the captured image data along with a device identifier (ID) directly to the remote device 104 over network 108, illustrated as block 806. Alternatively, the image capture device 302 may send the captured image data along with the device ID to a user device 102 or other device in the home via an out of band communication (such as Bluetooth) and the user device 102 or other device in the home may then send the captured image data to the remote device 104 over network 108.

The device ID may be an identifier that connects the image capture device 302 to a specific object, one or more consumable products, a user ID or other type of user profile (including a user name, mailing address, billing/payment information, preferences, order history, and other information for placing and completing an order/purchase of a product, etc.), etc. This information may be stored in the user profile/information database(s) 106. A user may have access to this information, and may edit, modify, change or otherwise set-up user preferences. This allows the user to control what happens when an indicator pattern/sequence on the object 802 is detected in one or more circumstance. For example, in this example, the device ID is associated with a specific model washing machine of object 802, a user profile, and a specific brand of laundry detergent.

Once the image data is captured and sent to the remote device 104, the remote device 104 receives the image data and the device ID, illustrated as block 808. The remote device access database(s) 106 and identifies all the information corresponding to the device ID. For example, the remote device 104 identifies the object 802 corresponding to the device ID, illustrated as block 810. The remote device 104 may also identify the user and other settings and preferences corresponding to the device ID.

The remote device 104 then determines an indicator pattern of the indicator(s) 804 in the image data, illustrated as block 812. This determination may be performed as described above. The remote device then performs an action corresponding to the indicator pattern, illustrated as block 814. For example, one stored indicator pattern of the object 802 may correspond to an action to order a consumable (such as a certain laundry product in accordance with the user preferences in the user profile and ship the product to the user's address). The remote device 104 may be set up to automatically order and ship the product or may send a message to the user via a user device (such as the user device 102) to confirm the order or identifying that the order was placed, illustrated as block 816. For example, the message may include any number of messages, such as notifying the user that he/she is out of or running low on a product, notifying the user that the object 802 is out of or running low on a product, sending a shipment notification, a receipt for the purchase of product, etc. The message can be provided in any format, including an augmented reality format using a cellular phone, Google goggles, etc.

The remote device 104 may utilize the user profile (including past purchase history, user preferences, etc.) and other data (including customer ratings of products, etc.) to determine the best product (such as a product corresponding to a product identifier (i.e. an Amazon Standard Identification Number (ASIN)) to order based on which products are currently in stock, compatible with the object 802, etc. As part of the process for ordering a product or before ordering a product, the remote device 104 may check the user's purchase history in the user profile to determine whether the product was recently ordered. In some embodiments, if the product was not recently ordered, the remote device 104 may re-order the product and/or prompt the user with a "one-click" reorder button for the product (e.g., on the user device, via email, text message, etc.).

In another example, when the indicator pattern of the indicator(s) 804 corresponds to the object 802 being broken or experiencing a malfunction, the remote device 104 may check the user's calendar in the user profile to determine if a repair service has already been scheduled to assist the user in fixing the issue. When no repair service has been scheduled, the remote device 104 may identify a repair service for the user and either schedule an appointment for the user on the calendar associated with the user profile and/or provide a suggestion to the user as to a repair service. In this example, the message referred to in block 816 may include a notification that indicates that object 802 is experiencing a problem which can be fixed by ABC repair service, object 802 is experiencing a problem and an appointment with ABC repair service has been scheduled an added to your calendar, etc.

It should be appreciated that the indicator pattern/sequence may be similar to those described above in which certain information about the function of the object may be identified and sent to the user device. Additionally, any number of actions can be pre-programmed to be initiated upon detection of a certain indicator pattern/sequence. These actions may also be modifiable, etc., by the user via the user profile or a user's account.

In some situations, a single image capture device 302 may be used in connection with more than one object. In these situations, the image processing may include the identification of more than one object (as mentioned above). Alternatively, the image capture device 302 may be associated with a device ID and the device ID may be associated with a location and object identifier of each object the image capture device 302 captures.

Figure 9:
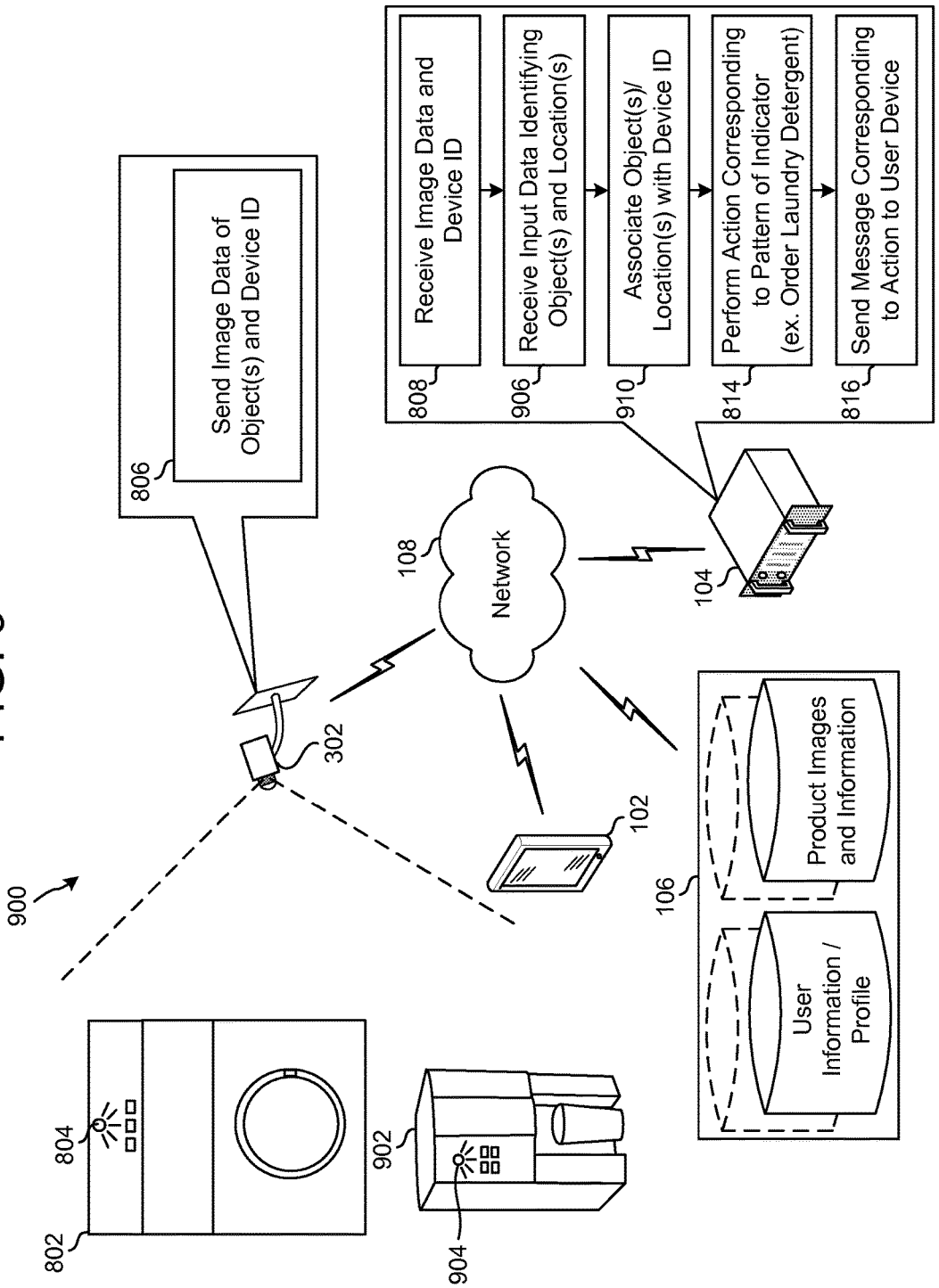
FIG. 9 illustrates another overview of a system for implementing embodiments of the present disclosure.

FIG. 9 illustrates another overview of a system 900 for implementing embodiments of the disclosure. The system includes the image capture 302, the user device 102, the remote device 104, and the one or more databases 106 that may be in communication with one another over the network 108. In this embodiment, the image capture device 302 may be a stand-alone camera that captures image data of object 802 (a washing machine in this embodiment) having one or more visual indicators 804 (such as LEDs) and object 902 (a coffee machine in this embodiment) having one or more visual indicators 904 (such as LEDs).

As described above, the image capture device 302 captures image data of the objects 802 and 902. The image capture device 302 may then send the captured image data along with a device identifier (ID) directly to the remote device 104 over network 108, illustrated as block 806. Alternatively, the image capture device 302 may send the captured image data along with the device ID to a user device 102 or other device in the home via an out of band communication (such as Bluetooth) and the user device 102 or other device in the home may then send the captured image data to the remote device 104 over network 108.

Once the image data is captured and sent to the remote device 104, the remote device 104 receives the image data and the device ID, illustrated as block 808. A user device 102 associated with the device ID may be notified or queried to enter input data corresponding to the objects 802 and 902 and their respective locations in the captured image data. The remote device 104 receives the input data, illustrated as block 906. The remote device 104 may then update the database(s) 106 to associate the device ID with the objects 802 and 902 and their locations. This allows subsequent capture image data to be analyzed and indicator patterns to be determined quickly and efficiently.

As described above, the remote device 104 may performs one or more actions corresponding to the indicator patterns, illustrated as block 814. For example, one stored indicator pattern of the object 802 may correspond to an action to order a consumable (such as a certain laundry product in accordance with the user preferences in the user profile and ship the product to the user's address). Another stored indicator pattern of the object 902 may correspond to an action to order a consumable (such as a certain coffee in accordance with the user preferences in the user profile and ship the product to the user's address). The remote device 104 may be set up to automatically order and ship the products or may send a message to the user via a user device (such as the user device 102) to confirm the order or relating to some other notification, etc., illustrated as block 816.

Figure 10:
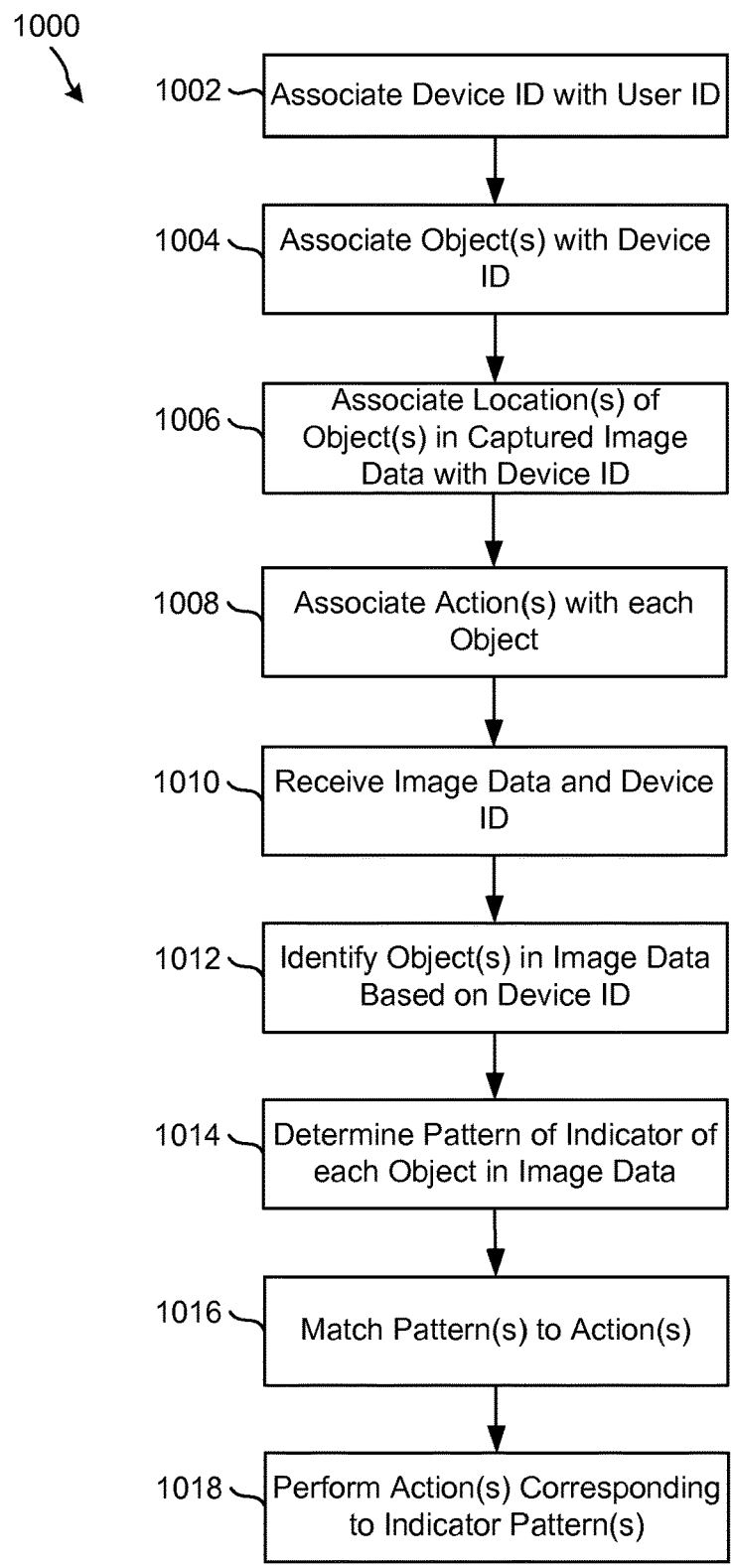
FIG. 10 illustrates an exemplary method of identifying an object and interpreting a visual indicator according to embodiments of the present disclosure.

FIG. 10 illustrates a method 1000 of associating a device ID with a user ID and objects according to embodiments of the disclosure. In block 1002, the remote device associates a device ID (such as an ID corresponding to devices 102, 302, etc.). This association may be stored in a user profile stored in one or more databases (such as database(s) 106). The remote device may also associate an object (or object identifier) with the device ID and/or user ID, illustrated as block 1004. This association may also be stored in a user profile stored in one or more databases (such as database(s) 106). The object identifier may be determined by the remote device in accordance with the image matching techniques described herein. Alternatively, the user may input or select a model of the object, and the remote device may determine the object identifier based on the model, for example, by looking up the model in a look-up table (LUT) in the product images and information database(s) 106. Similarly, the associations may be determined based on a purchase history and/or user profile of a user, input from the user, pre-configuration, etc.

The remote device may also associate locations of one or more objects in an image with the object identifiers, the device ID and/or user ID, illustrated as block 1006. This association may also be stored in a user profile stored in one or more databases (such as database(s) 106). The locations may be determined by the remote device in accordance with the image matching techniques described herein. Alternatively, the user may input locations of the objects.

The remote device may also associate actions with each object identifier corresponding to certain indicator sequences/patterns of each object with each corresponding object identifier, the device ID and/or user ID, illustrated as block 1008. This association may also be stored in a user profile stored in one or more databases (such as database(s) 106). The actions may be selected by the user or may be default actions. These action may include any number of actions relating to the object. For example, the actions may relate to ordering a consumable, notifying a user of a malfunction, informing the user of the meaning of the indicator pattern/sequence, providing potential replacement products, providing repair and/or customer service information, providing instructions on how to handle issues, scheduling an appointment with a repair service, etc.

The remote device may then perform such actions in response to detecting a certain indicator pattern/sequence. For example, the remote device may receive image data and the device ID, illustrated as block 1010. The remote device access database(s) (such as database(s) 106) and identifies one or more objects corresponding to the device ID, illustrated as block 1012. The remote device then determines an indicator pattern of each indicator(s) of each object in the image data, illustrated as block 1014. The remote device may then match the indicator patterns to known patterns and determine actions associated with each detected indicator pattern, illustrated as block 1016. The remote device may then perform the action(s) corresponding to the indicator pattern, illustrated as block 1018.

Figure 11:
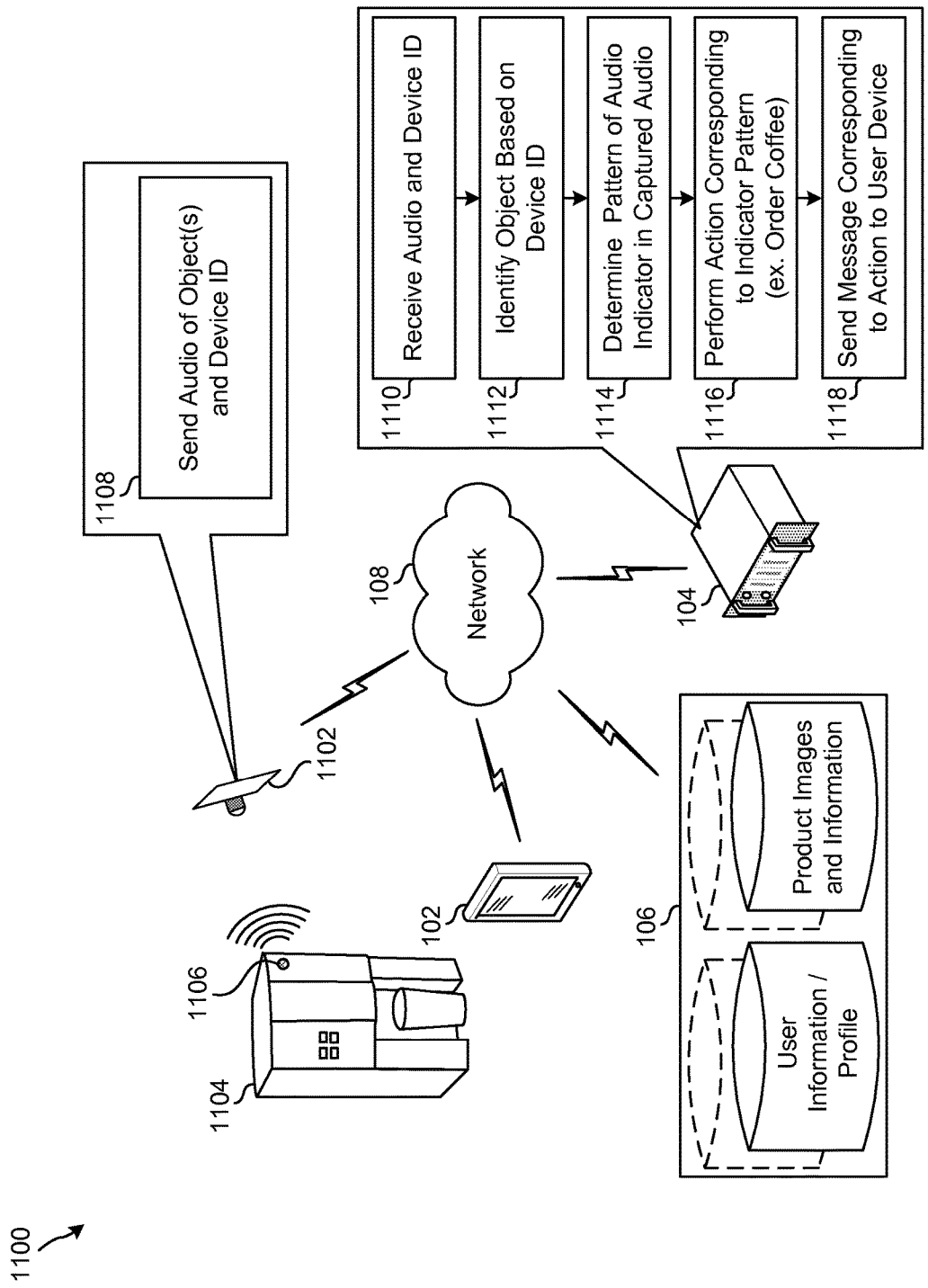
FIG. 11 illustrates another overview of a system for implementing embodiments of the present disclosure.

In other embodiments, the indicator may be an audible indicator instead of or in addition to the visual indicators described above. In this respect, the remote device may employ audio matching techniques to match audio indicator patterns/sequences to stored audio patterns/sequences, and perform actions or provide information to a user device as described above. FIG. 11 illustrates an overview of a system 1100 for implementing embodiments of the present disclosure with respect to audio indicators. The system includes an audio capture device 1102 (such as a microphone), the user device 102, the remote device 104, and the one or more databases 106 that may be in communication with one another over the network 108. In this embodiment, the audio capture device 1102 may be a stand-alone device that captures audio data of object 1104 (a coffee machine in this embodiment) having one or more audio indicators 1106 (such as speaker(s)).

The audio capture device 1102 captures audio data of the object 1104. The audio capture device 1102 may then send the captured audio data along with a device identifier (ID) directly to the remote device 104 over network 108, illustrated as block 1108. Alternatively, the audio capture device 1102 may send the captured audio data along with the device ID to a user device 102 or other device in the home via an out of band communication (such as Bluetooth) and the user device 102 or other device in the home may then send the captured audio data to the remote device 104 over network 108.

Once the audio data is captured and sent to the remote device 104, the remote device 104 receives the audio data and the device ID, illustrated as block 1110. The remote device then uses the device ID to look-up a corresponding object in look-up table (LUT) in a database (such as databases(s) 106), illustrated as block 1112. As described above, the device ID, user ID, object identifier, user profile, etc. may all be linked to one another. Additionally, one or more indicator sequences/patterns may be linked to the object identifier and one or more actions may be linked to each indicator sequence/pattern, as described above.

The remote device 104 may determine a pattern/sequence of the indicator based on the audio data, illustrated as block 1114. The pattern/sequence may be determined using audio fingerprinting techniques. For example, digital summaries of known audio including a known indicator pattern/sequence may be generated based on frequency, intensity, time, and other parameters of the audio. This digital summary may then be stored, for example in database(s) 106, in association with the device ID, user ID, object identifier, user profile, etc. The remote device, may generate such as digital summary (or audio fingerprint) of the audio in the received audio data and compare the audio fingerprint of the received audio data to the stored audio fingerprints to determine the indicator pattern/sequence.

The remote device 104 may then performs one or more actions corresponding to the indicator pattern(s) detected, illustrated as block 1116. For example, one stored indicator pattern of the object 1104 may correspond to an action to order a consumable (such as a certain coffee in accordance with the user preferences in the user profile and ship the product to the user's home mailing address). The remote device 104 may be set up to automatically order and ship the products or may send a message to the user via a user device (such as the user device 102) to confirm the order or relating to some other notification, etc., illustrated as block 1118.

Figure 12:
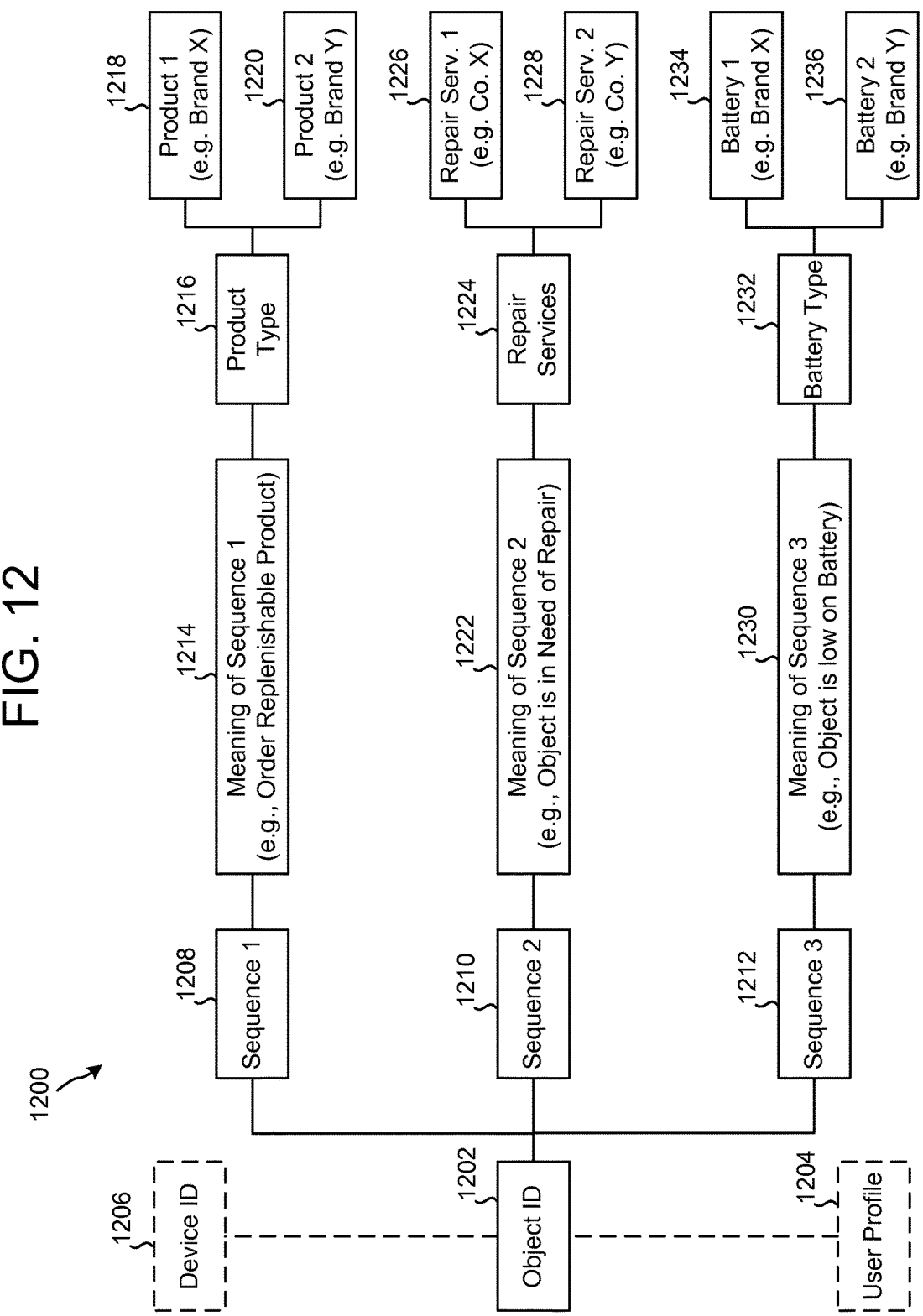
FIG. 12 illustrates an overview of a data type flow structure corresponding to an object identifier for implementing embodiments of the present disclosure.

As described above, the systems and methods may include identifying an object, determining a meaning of an indicator associated with the object, and sending a message/ performing an action based on the meaning of the indicator. To perform the methods described herein, various pieces of data and data structures may be used. An example, of a data type flow structure 1200 relating to an object ID is illustrated in FIG. 12. In this example, the remote device may identify an object and determine an object ID 1202 corresponding to the object. The object ID 1202 may be associated with a type, brand, manufacturer, model number, year, etc. of the object. The object ID 1202 may be associated with a user profile 1204 (i.e., a profile of an owner of the object) and a device ID 1206 (i.e., an ID corresponding to the image capture device). As described above, the object may include or be associated with an indicator. In this respect, the object ID 1210 may also be associated with one or more indicator sequences 1208-1212 (which may be used to determine a sequence of the indicator represented in received image or audio data of the object).

As illustrated, sequence 1 1208 is associated with a meaning of the sequence 1 1214. As an example, the sequence 1 1208 may relate to the indicator being illuminated, and the meaning of this sequence may relate to ordering a replenishable product. A product type 1216 may also be associated with the object ID and/or the meaning of sequence 1 1214. For example, when the object ID 1202 corresponds to a Brand X coffee machine having model number XYZ, the product type may relate to a category of cups that are compatible with the coffee machine. This product type 1216 may also be associated with various products that are available and can be purchased and shipped to a user, such as product 1 1218 and product 2 1220. Since the object ID 1202 is associated with user profile 1204, the systems and methods may also reference the user profile 1204 to determine which product the user would like to purchase and automatically purchase the correct product and ship the product to the user.

Sequence 2 1210 is associated with a meaning of the sequence 2 1222. As an example, the sequence 2 1210 may relate to the indicator flashing continuously, and the meaning of this sequence may relate to the object associated with the object ID 1202 being in need of repair. A type of repair services 1224 may also be associated with the object ID and/or the meaning of sequence 2 1222. For example, the repair services 1224 may relate to a category of repair services for a Brand X coffee machine having model number XYZ. This type of type of repair services 1224 may also be associated with various repair services that may be contacted to repair the Brand X coffee machine having model number XYZ, such as repair service 1 1226 and repair service 2 1228. Since the object ID 1202 is associated with user profile 1204, the systems and methods may also reference the user profile 1204 to determine a location of the object (i.e., at a user's home address) and determine an appropriate repair service for the user.

Similarly, sequence 3 1212 is associated with a meaning of the sequence 3 1230. As an example, the sequence 3 1212 may relate to the indicator flashing two times, and the meaning of this sequence may relate to the object being low on battery power. A battery type 1232 may also be associated with the object ID and/or the meaning of sequence 3 1230. For example, when the object ID 1202 corresponds to a Brand X smoke detector having model number XYZ, the battery type may relate to a category of 9 Volt type batteries (such as, a Energizer batteries, Duracell Batteries, etc.) that are compatible with the smoke detector. This battery type 1232 may also be associated with various products that are available and can be purchased and shipped to a user, such as battery 1 1234 and battery 2 1236. Since the object ID 1202 is associated with user profile 1204, the systems and methods may also reference the user profile 1204 to determine which replacement battery the user would like to purchase and automatically purchase the correct replacement battery and ship the replacement battery to the user.

Figure 13:
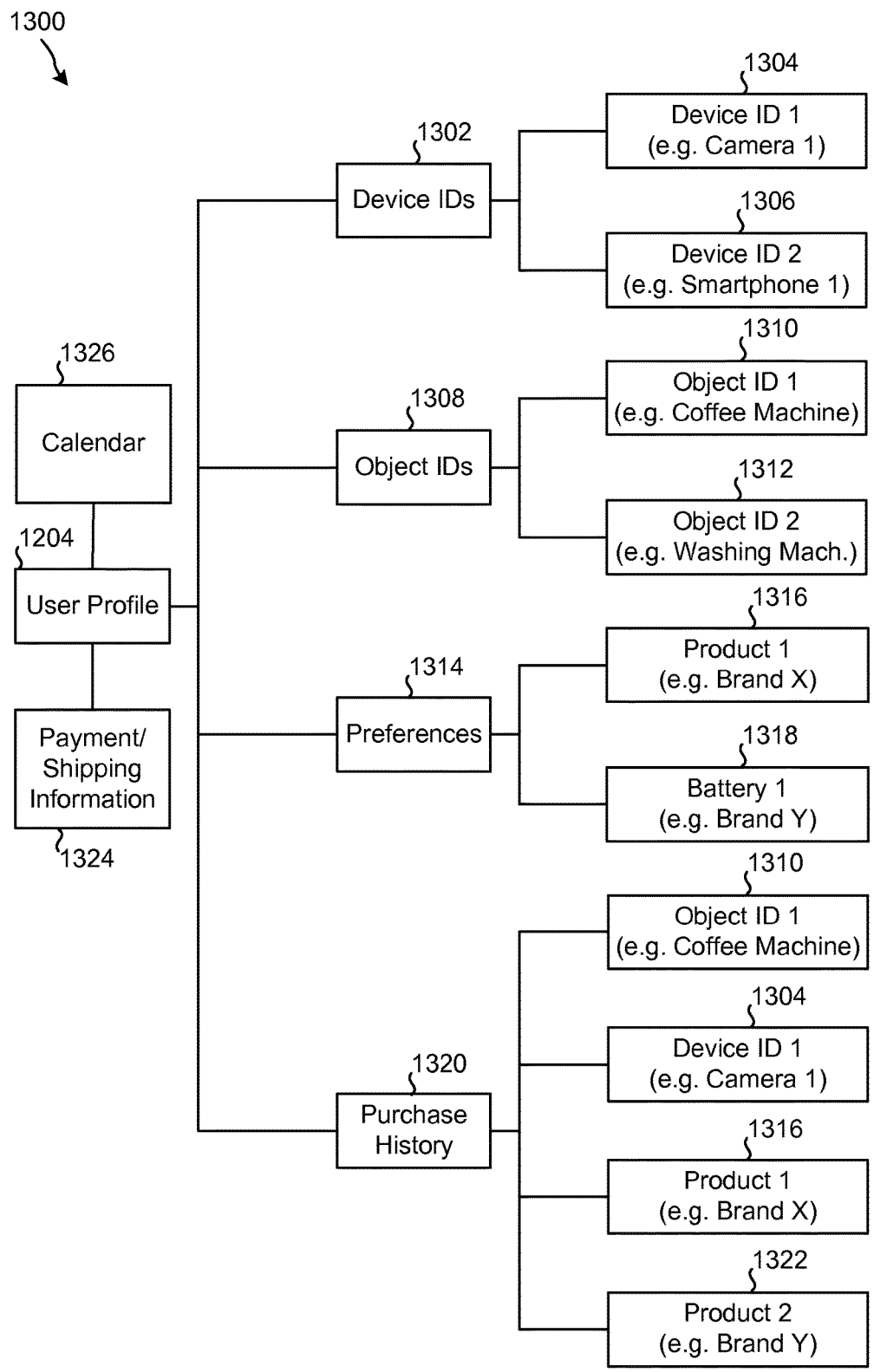
FIG. 13 illustrates an overview of a data type flow structure corresponding to a user profile for implementing embodiments of the present disclosure.

An example, of a data type flow structure 1300 relating to a user profile is illustrated in FIG. 13. In this example, the user profile 1204 may include and/or be associated with one or more device IDs 1302, such as Device ID 1 1304 (e.g., corresponding to a camera at a user's home) and Device ID 2 1306 (e.g., corresponding to a smartphone of the user). Either of these device IDs may be the device ID 1206. The user profile 1204 may also include and/or be associated with one or more object IDs 1308, such as Object ID 1 1310 (e.g., corresponding to a specific brand and model coffee machine) and Object ID 2 1312 (e.g., corresponding to a specific brand and model washing machine). Either of these Object IDs may be the object ID 1202, and associated with sequences, meanings of the sequences, products, repair services, etc.

The user profile 1204 may also include or be associated with preferences 1314, such as product 1 1316 corresponding to a specific type of product (such as, Brand X, hazelnut, coffee K-Cups), and battery 1 1318 corresponding to a specific type of battery (such as, a Brand Y, 9 Volt battery). These preferences may be used to determine which product to automatically order for the user. For example, referring to FIGS. 12 and 13, the object ID 1202 may correspond to a Brand X coffee machine having model number XYZ. When the sequence 1 1208 having the meaning 1214 relating to ordering a replenishable product, is determined to occur, the systems and methods may reference the user profile 1204 and determine that product 1 1316 corresponding to Brand X, hazelnut, coffee K-Cups should be ordered and shipped to the user at the user's mailing address.

Before ordering the product 1 1316 corresponding to Brand X, hazelnut, coffee K-Cups, the systems and methods may check the user's purchase history 1320, which may also be included in an/or associated with the user profile 1204. For example, the systems and methods may check to determine whether the product 1 1316 was recently ordered, and if not order the product 1 1316 and ship the product 1 1316 to the user's address and/or send a message with a prompt to the user with a "one-click" order button for the product 1 1316 (e.g., via a device, such as Device ID 2 1306, via email, etc.).

The purchase history 1320 may also include or be associated with the Object ID 1 1310. This information means that the Object associated with the Object 1 ID 1310 was previously purchased by the user. This information may be used to assist in identifying an object represented in image data or audio data. For example, if the object represented in image data relates to a coffee machine, but it is unclear which brand and model the coffee machine relates to, the fact that the user purchased the brand and model coffee machine associated with Object 1 ID 1310 may be used to identify the object. Thus, it can be determined that the object represented in image data corresponds to the previously purchased object of the Object 1 ID 1310.

Similarly, the purchase history 1320 may include or be associated with the Device ID 1 1304, a Product 2 1322, a repair services used in the past (such as repair service 2 1228 illustrated in FIG. 12), etc. All of this information may be used to assist in the identification of objects and the selection of products, repair services, etc.

The user profile 1204 may include or be associated with payment and shipping information 1324 to allow for the automatic purchase of products and shipment of those products to an address of the user. The user profile 1204 may also include or be associated with a calendar of the user 1326. The calendar 1326 may be used in the scheduling of repair services, shipment of products, etc. For example, referring to FIGS. 12 and 13, an object ID 1202 may correspond to a Brand X coffee machine having model number XYZ. When the sequence 2 1210 having the meaning 1222 relating to the object being in need of repair is determined to occur, the systems and methods may reference the user profile 1204 and the calendar 1326 determine whether a repair service has already been scheduled to fix the problem. When no repair service has been scheduled, a local repair service (such as the repair service 2 1228) may be selected for the user. The systems and methods may also schedule an appointment on the calendar 1326 and/or provide a suggestion to the user as to a repair service (i.e., your coffee machine is in need of repair, which can be fixed by Company Y repair services).

When the preferences 1314 and 1320 do not provide enough information to allow a decision as to which product, repair service, etc. to select for the user, the systems and methods may leverage customer ratings and other such data to select an appropriate product, repair service, etc. for the user.

Figure 14:
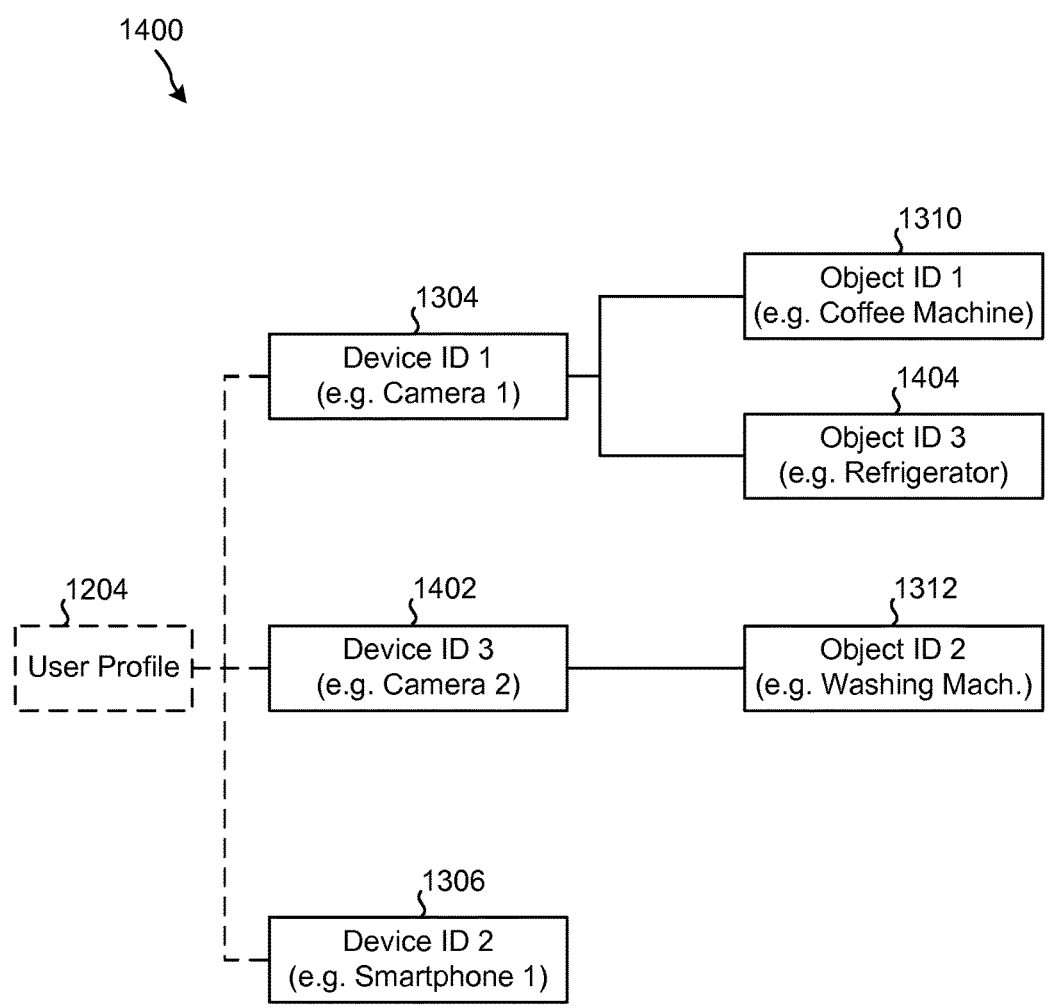
FIG. 14 illustrates an overview of a data type flow structure corresponding to a device identifier for implementing embodiments of the present disclosure.

The device IDs may also be associated with certain information, which may assist in identifying objects and selecting products, repair services, etc. An example, of a data type flow structure 1400 relating to device IDs is illustrated in FIG. 14. In this example, Device ID 1 1304 may be associated with object IDs, such as Object ID 1 1310 and Object ID 3 1404. The association of the object IDs with the Device ID may be used to identify the objects that are within a field of view of the device associated with the device ID. For example, Device ID 1 1304 may correspond to a cameral positioned in a user's kitchen, and Object ID 1 1310 may correspond to a coffee machine located in a right side of a field of view of the camera and Object ID 3 1404 may correspond to a refrigerator located in a left side of the field of view of the camera. This information may be stored in association with the Device ID 1 1304, as well as the Object ID 1 1310 and Object ID 3 1404. This allows for the systems and methods to quickly identify the objects represented in image data received from the camera. For example, when image data is received from the camera along with the device ID, the systems and methods may reference the information associated with the device ID and thereby understand that the object on the left is the object associated with Object ID 3 1404, and the object on the right is the object associated with Object ID 1 1310.

Similarly, a Device ID 3 1402 (corresponding to a second camera in the user's home) may be associated with object IDs, such as Object ID 2 1312 (corresponding to a washing machine). Each of the device IDs may also be associated with each other and the user profile 1204.

The user profile 1204 may also be accessible to the user to allow the user to input, modify, remove, etc. preferences, payment information, an address, etc. The user may also user the user profile 1204 to confirm that the identified objects in the field of view of corresponding devices are correctly identified by accessing the user profile 1204 online It should be appreciated that data flow structures illustrated in FIGS. 12-14 are merely examples and the various pieces of data may be associated with one another an organized in any applicable manner.

It should be also be appreciated that the audio indicator may be used instead of or in addition to the visual indicators described in a similar manner. Thus, any of the methods described herein may be combined, steps may be interchanged, etc. with one or more other methods described herein.

The concepts disclosed herein may be applied within a number of different devices and computer systems, including, for example, general-purpose computing systems, multimedia set-top boxes, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc. Through the network 108, one or more components may be distributed across a networked environment. For example, multiple computing devices (such as the user device 102, image/capture device 302, remote device 104, etc.) may be employed in a system. In such a multi-device system, each of the devices may include different components for performing different aspects of the processes described herein. The multiple devices may include overlapping components.

Figure 15:
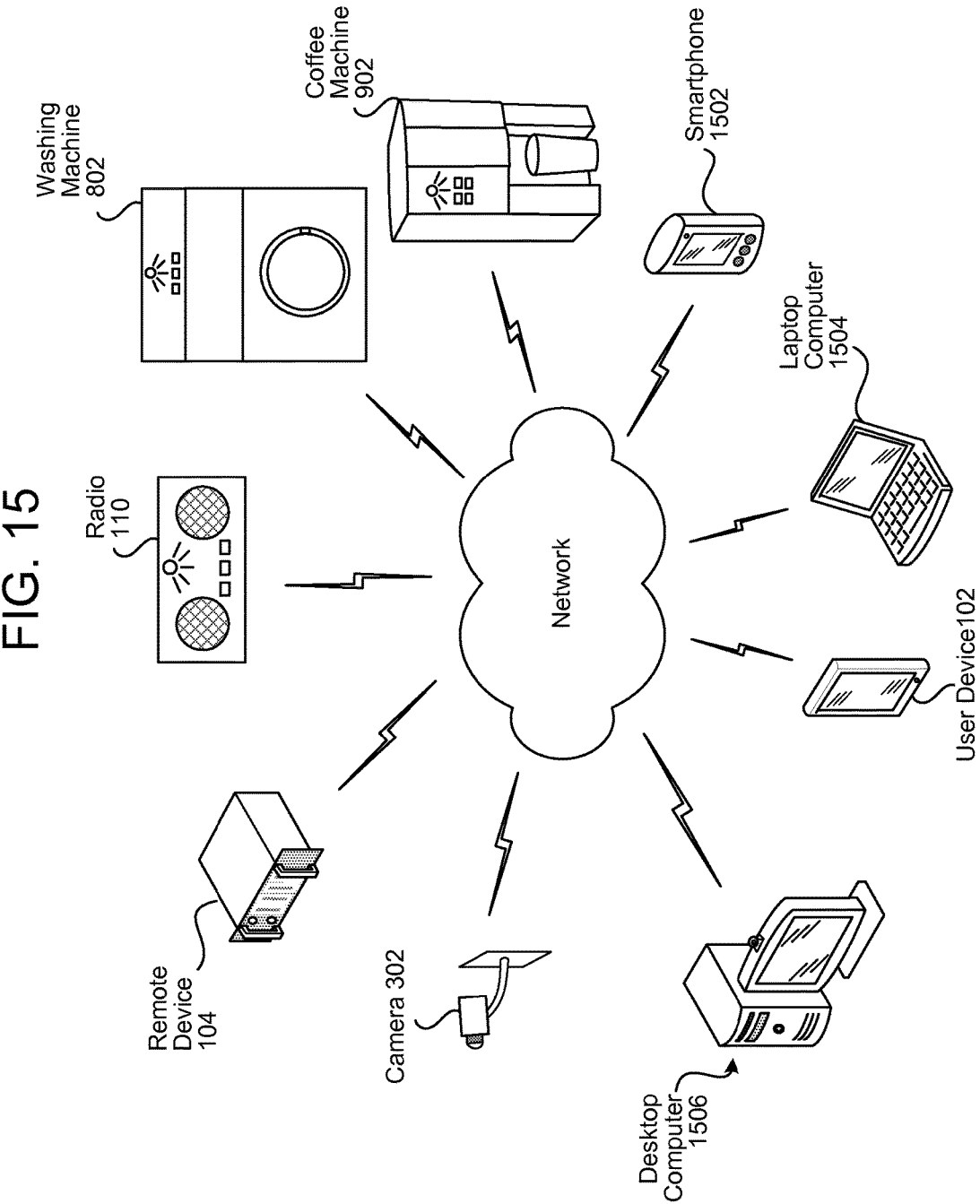
FIG. 15 illustrates a network for use with distributed processing according to embodiments of the present disclosure.

As illustrated in FIG. 15, multiple devices (102, 104, 110, 302, 306, 802, 902, 1102, 1110, and 1502-1506, etc.) may contain components of the system and the devices may be connected over the network 108. Network 108 may include a local or private network or may include a wide network such as the internet. Devices may be connected to the network 108 through either wired or wireless connections. For example, a smartphone 1502, a laptop computer 1504, a desktop computer 1506, and the user device 102, image capture device 302, objects 110, 802, 902, and remote device 104 may be connected to the network 108 through a wireless service provider, over a WiFi or cellular network connection or the like, or a wired connection. These networked devices may include embedded audio input devices, such as an internal microphone and speaker, and one or more of the devices may include an audio processing module.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Aspects of the disclosed systems and methods may be applied in an industrial setting. For example, the image capture device(s) can be permanently installed cameras (such as security cameras) and the indicators can belong to factory or other industrial equipment.

Additionally, the visual indicator could be a number of different types of components, such as an LED, a light, a chemical based indicator that changes color (such as an indicator for integrated circuits), a breakable indicator, or any other type of indication that is visually perceptible.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more components of the user device 102, image capture device 302, or remote device 104 may be implemented as firmware or as a state machine in hardware. For example, at least the processing modules may be implemented as an application specific integrated circuit (ASIC), a digital signal processor (DSP), a field programmable gate array (FPGA), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for detecting and interpreting a visual indicator, comprising:
    receiving, from a user device associated with a user profile, image data representing a light emitting diode (LED) of an appliance;
    identifying a type of the appliance using the image data;
    determining stored pixel coordinates corresponding to a reference location of the LED relative to the appliance and a stored illumination sequence of the LED;
    identifying, based on reference data, pixel coordinates in an image frame, the pixel coordinates corresponding to a location of the LED in the image data;
    determining a first luminescence value and first color value of a first pixel value in a first image of the image data, wherein the first pixel value corresponds to the location of the LED in the first image and the first image corresponds to a first time;
    determining a second luminescence value and second color value of a second pixel value in a second image of the image data, wherein the second pixel value corresponds to the location of the LED in the second image and the second image corresponds to a second time after the first time;
    determining that the first luminescence value, the first color value, the second luminescence value and the second color value correspond to the stored illumination sequence of the LED;
    identifying information associated with the stored illumination sequence, the information relating to the appliance; and
    sending the information to the user device.

2. The computer-implemented method of claim 1, wherein:
    identifying the type of the appliance includes determining the appliance corresponds to a previously purchased appliance associated with the user profile; and
    identifying the information associated with the stored illumination sequence includes determining a product is to be ordered relating to the appliance;

the method further comprises:
   determining a preferred product associated with the user profile,
   determining a mailing address associated with the user profile, and
   automatically ordering the preferred product for shipment to the mailing address; and
   wherein sending the information to the user device includes sending a receipt for the purchase of the preferred product.

3. The computer-implemented method of claim 1, further comprising:
   associating the stored pixel coordinates with the type of appliance;
   associating the stored illumination sequence with the type of appliance;
   associating the information associated with the stored illumination sequence with the type of appliance; and
   associating compatible products with the type of appliance.

4. A computer-implemented method, comprising:
   receiving image data associated with a user profile;
   identifying an object represented in the image data, the object including an illuminated visual indicator;
   determining a meaning of the illuminated visual indicator based at least in part on a luminescence value of a pixel within a bounded region of the image data, the bounded region corresponding to the illuminated visual indicator;
   identifying information corresponding to the meaning; and
   sending a message to a device associated with the user profile, the message including the information.

5. The computer-implemented method of claim 4, wherein determining the meaning includes identifying stored pixel coordinates included in reference data corresponding to a reference location of the illuminated visual indicator relative to the identified object.

6. The computer-implemented method of claim 4, wherein determining the luminescence value includes:
   applying a discreet cosine transform to the bounded region; and
   determining a coefficient from a luminance component of the luminance and chrominance YUV color space of the image data.

7. The computer-implemented method of claim 4, wherein determining the meaning includes:
   determining a first luminescence value of a first pixel value in a first image of the image data, wherein the first pixel value corresponds to the illuminated visual indicator in the first image and the first image corresponds to a first time;
   determining a second luminescence value of a second pixel value in a second image of the image data, wherein the second pixel value corresponds to the illuminated visual indicator in the second image and the second image corresponds to a second time; and
   generating a first data set based on the first and second luminescence values.

8. The computer-implemented method of claim 7, wherein determining the meaning includes:
   bounding a second region corresponding to a second location within the image data proximate to the illuminated visual indicator;
   determining a third luminescence value of a third pixel value in the first image of the image data corresponding to the second location;
   determining a fourth luminescence value of a fourth pixel value in the second image of the image data corresponding to the second location;
   generating a second data set corresponding to the third and fourth luminescence values; and
   determining the first and second luminescence values are caused by the illuminated visual indicator as opposed to an external effect based on the first data set failing to substantially match the second data set.

9. The computer-implemented method of claim 7, wherein determining the meaning comprises matching the first data set to a stored data set associated with the identified object.

10. The computer-implemented method of claim 4, wherein sending the message to the device associated with the user profile includes sending at least one of the meaning of a sequence of illumination, instructions corresponding to how to fix the object, potential replacement parts for the object, options for purchasing a potential replacement object, contact information of a repair service, or options to purchase consumable items associated with the object.

11. The computer-implemented method of claim 4, further comprising:
   receiving audio data corresponding to the object, the audio data including an audio indicator associated with the object;
   comparing an audio fingerprint to stored audio fingerprints corresponding to stored audio sequences associated with the object;
   determining an audio sequence of the audio indicator based on the audio fingerprint matching a stored audio fingerprint; and
   wherein identifying information corresponding to a sequence of illumination includes identifying information corresponding to the audio sequence.

12. A system, comprising:
   at least one processor; and
   at least one memory including instructions operable to be executed by the at least one processor to perform a set of actions, configuring the at least one processor to:
   receive image data associated with a user profile;
   identify an object represented in the image data, the object including an illuminated visual indicator;
   determine a meaning of the illuminated visual indicator in the image data based at least in part on a luminescence values of a pixel within a bounded region corresponding to the illuminated visual indicator;
   identify information corresponding to the meaning; and
   send a message to a device associated with the user profile, the message including the information.

13. The system of claim 12, wherein the at least one processor is further configured to determine the meaning by identifying reference data including stored pixel coordinates corresponding to a reference location of the illuminated visual indicator relative to the identified object.

14. The system of claim 12, wherein the at least one processor is further configured to determine the meaning by:
   applying a discreet cosine transform to the bounded region; and
   determining a coefficient from a luminance component of the luminance and chrominance YUV color space of the image data.

15. The system of claim 12, wherein the at least one processor is further configured to determine the meaning by:
   determining a first luminescence value of a first pixel value in a first image of the image data, wherein the first pixel value corresponds to the illuminated visual indicator in the first image and the first image corresponds to a first time;

determining a second luminescence value of a second pixel value in a second image of the image data, wherein the second pixel value corresponds to the illuminated visual indicator in the second image and the second image corresponds to a second time; and generating a first data set based on the first and second luminescence values.

16. The system of claim 15, wherein the at least one processor is further configured to determine the meaning by:

bounding a second region corresponding to a second location within the image data proximate to the illuminated visual indicator;

determining a third luminescence value of a third pixel value in the first image of the image data corresponding to the second location;

determining a fourth luminescence value of a fourth pixel value in the second image of the image data corresponding to the second location;

generating a second data set corresponding to the third and fourth luminescence values; and determining the first and second luminescence values are caused by the illuminated visual indicator as opposed to an external effect based on the first data set failing to substantially match the second data set.

17. The system of claim 15, wherein the at least one processor is further configured to determine the meaning by matching the first data set to a stored data set associated with the identified object.

18. The system of claim 12, wherein the at least one processor is further configured to send the message to the device associated with the user profile includes sending at least one of the meaning of a sequence of illumination, instructions corresponding to how to fix the object, potential replacement parts for the object, options for purchasing a potential replacement object, contact information of a repair service, or options to purchase consumable items associated with the object.

* * * * *